US012699734B1

(12) United States Patent
Mogill

(10) Patent No.: US 12,699,734 B1
(45) Date of Patent: Aug. 4, 2026

(54) APPARATUS AND METHOD FOR GENERATING A NODE DATABASE

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/361,679

(22) Filed: Oct. 17, 2025

(51) Int. Cl.
*G06F 16/90* (2019.01)
*G06F 16/901* (2019.01)
*G06F 21/60* (2013.01)

(52) U.S. Cl.
CPC ........ *G06F 16/9024* (2019.01); *G06F 21/602* (2013.01)

(58) Field of Classification Search
CPC ............................ G06F 16/9024; G06F 21/602
See application file for complete search history.

(56) References Cited

U.S. PATENT DOCUMENTS

| | | | |
|---|---|---|---|
| 2019/0362290 A1* | 11/2019 | Rogynskyy | G06Q 10/107 |
| 2020/0162448 A1 | 5/2020 | Dasika Venkata Devi et al. | |
| 2021/0390201 A1* | 12/2021 | Adhikari | G06F 21/645 |
| 2022/0237706 A1* | 7/2022 | Leise | H04L 9/30 |
| 2023/0306139 A1 | 9/2023 | Shah et al. | |
| 2025/0190966 A1* | 6/2025 | Gutierrez-Sheris | G06Q 20/20 |
| 2025/0205581 A1* | 6/2025 | Charles | A63B 71/0622 |

FOREIGN PATENT DOCUMENTS

| | | |
|---|---|---|
| CN | 119991364 A | 5/2025 |
| CN | 120654274 A | 9/2025 |
| DE | 202025001332 U1 | 7/2025 |
| IN | 202211020776 A | 4/2022 |

OTHER PUBLICATIONS

Yue et al GlassDB: An Efficient Verifiable Ledger Database System Through Transparency arXiv:2207.00944v3 [cs.DB] Feb. 20, 2023.
Bordel et al A blockchain ledger for securing isolated ambient intelligence deployments using reputation and information theory metrics "Wireless Networks vol. 30, pp. 5887-5903, (2024)".

* cited by examiner

*Primary Examiner* — Merilyn P Nguyen
(74) *Attorney, Agent, or Firm* — CALDWELL LLC

(57) ABSTRACT

Apparatus and method for generating a node database. The apparatus includes at least a processor and a memory communicatively connected to the at least a processor. The memory instructs the processor to receive a node profile of a plurality of node profiles, wherein the node profile comprises a node data, identify one or more operational parameters and attribute metrics of the node data, compare the one or more operational parameters and the attribute metrics with target data, determine, using a comparison of one or more operational parameters and the attribute metrics with target data, a status of the node profile, generate a node database as a function of the status of the node profile, generate and transmit an acceptance signal to the node associated with the node profile as a function of the status, wherein the status comprises an acceptance status, and store the node database within an immutable ledger.

20 Claims, 8 Drawing Sheets

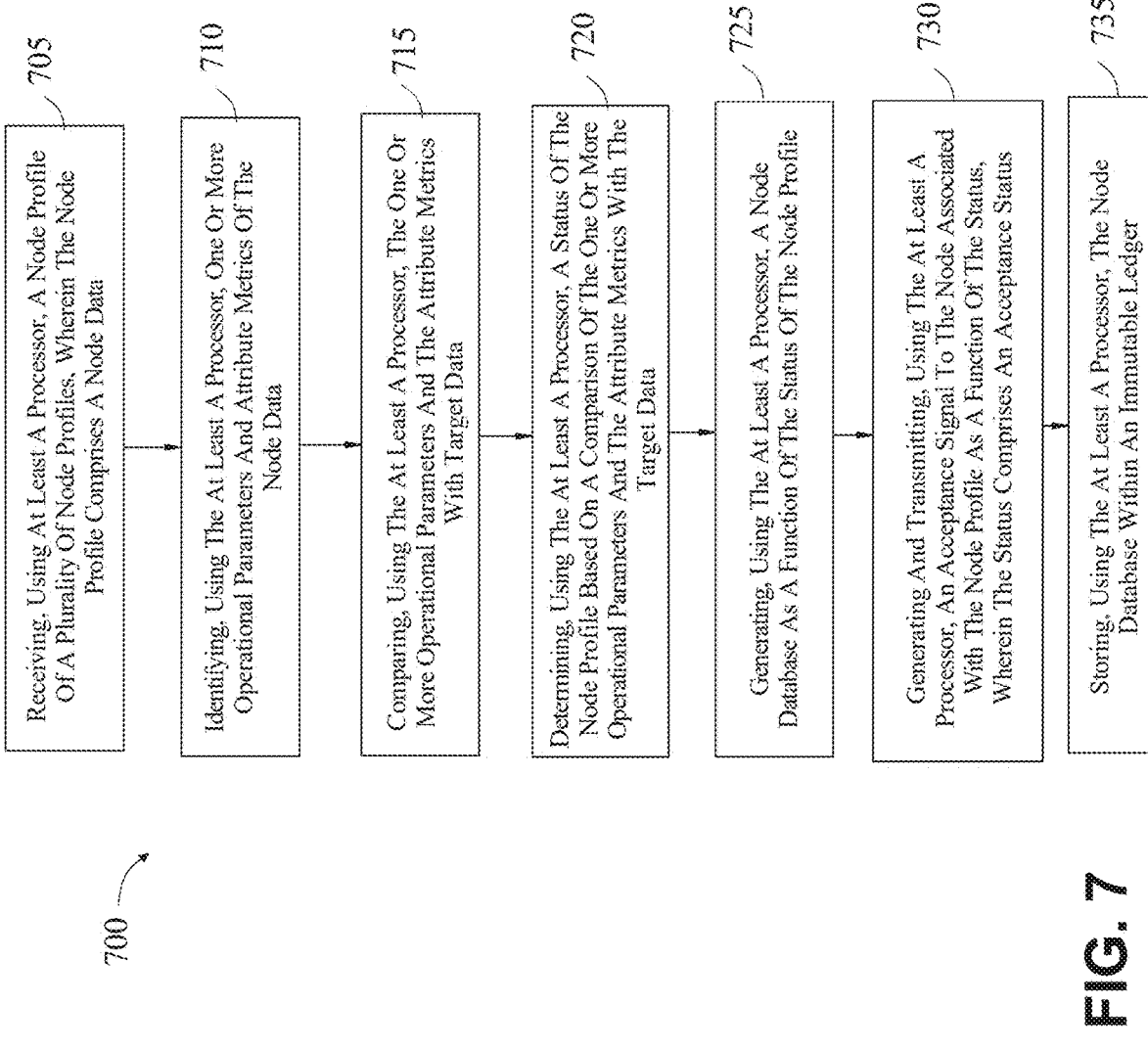

700

705

Receiving, Using At Least A Processor, A Node Profile Of A Plurality Of Node Profiles, Wherein The Node Profile Comprises A Node Data

710

Identifying, Using The At Least A Processor, One Or More Operational Parameters And Attribute Metrics Of The Node Data

715

Comparing, Using The At Least A Processor, The One Or More Operational Parameters And The Attribute Metrics With Target Data

720

Determining, Using The At Least A Processor, A Status Of The Node Profile Based On A Comparison Of The One Or More Operational Parameters And The Attribute Metrics With The Target Data

725

Generating, Using The At Least A Processor, A Node Database As A Function Of The Status Of The Node Profile

730

Generating And Transmitting, Using The At Least A Processor, An Acceptance Signal To The Node Associated With The Node Profile As A Function Of The Status, Wherein The Status Comprises An Acceptance Status

735

Storing, Using The At Least A Processor, The Node Database Within An Immutable Ledger

FIG. 7

APPARATUS AND METHOD FOR GENERATING A NODE DATABASE

FIELD OF THE INVENTION

The present invention generally relates to the field of artificial intelligence. In particular, the present invention is directed to an apparatus and a method for generating a node database.

BACKGROUND

Entities that rely on large volumes of node data often face difficulty in verifying the accuracy and integrity of that data, particularly where inputs are inconsistent, misrepresented, or incomplete. Conventional approaches lack reliable mechanisms for classifying and validating node information against trusted benchmarks, leading to uncertainty in determining the status of individual node profiles. Moreover, current systems provide limited transparency and traceability, making it challenging to ensure long-term confidence in stored records.

SUMMARY OF THE DISCLOSURE

In an aspect, an apparatus for generating a node database includes at least a processor and a memory communicatively connected to the at least a processor. The memory contains instructions configuring the processor to receive a node profile of a plurality of node profiles, wherein the node profile comprises a node data, identify one or more operational parameters and attribute metrics of the node data, compare the one or more operational parameters and the attribute metrics with target data, determine, using a comparison of the one or more operational parameters and the attribute metrics with target data, a status of the node profile, generate a node database as a function of the status of the node profile, generate and transmit an acceptance signal to the node associated with the node profile as a function of the status, wherein the status comprises an acceptance status, and store the node database within an immutable ledger.

In another aspect, a method for generating a node database includes receiving, using at least a processor, a node profile of a plurality of node profiles, wherein the node profile comprises a node data, identifying, using the at least a processor, one or more operational parameters and attribute metrics of the node data, comparing, using the at least a processor, the one or more operational parameters and the attribute metrics with target data, determining, using the at least a processor, a status of the node profile based on a comparison of the one or more operational parameters and the attribute metrics with target data, generating, using the at least a processor, a node database as a function of the status of the node profile, generating and transmitting an acceptance signal to the node associated with the node profile as a function of the status, wherein the status comprises an acceptance status, and storing, using the at least a processor, the node database within an immutable ledger.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein:

FIG. 7 is a block diagram of an exemplary method for generating a node database.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating a node database. The apparatus includes at least a computing device comprised of a processor and a memory communicatively connected to the processor. The memory instructs the processor to receive a node profile of a plurality of node profiles, wherein the node profile comprises a node data. The processor identifies one or more operational parameters and attribute metrics of the node data. The processor compares the one or more operational parameters and the attribute metrics with target data. Additionally, the processor determines, using a comparison of the one or more operational parameters and the attribute metrics with target data, a status of the node profile. The processor generates a node database as a function of the status of the node profile. The memory then instructs the processor to store the node database within an immutable ledger.

Figure 1:
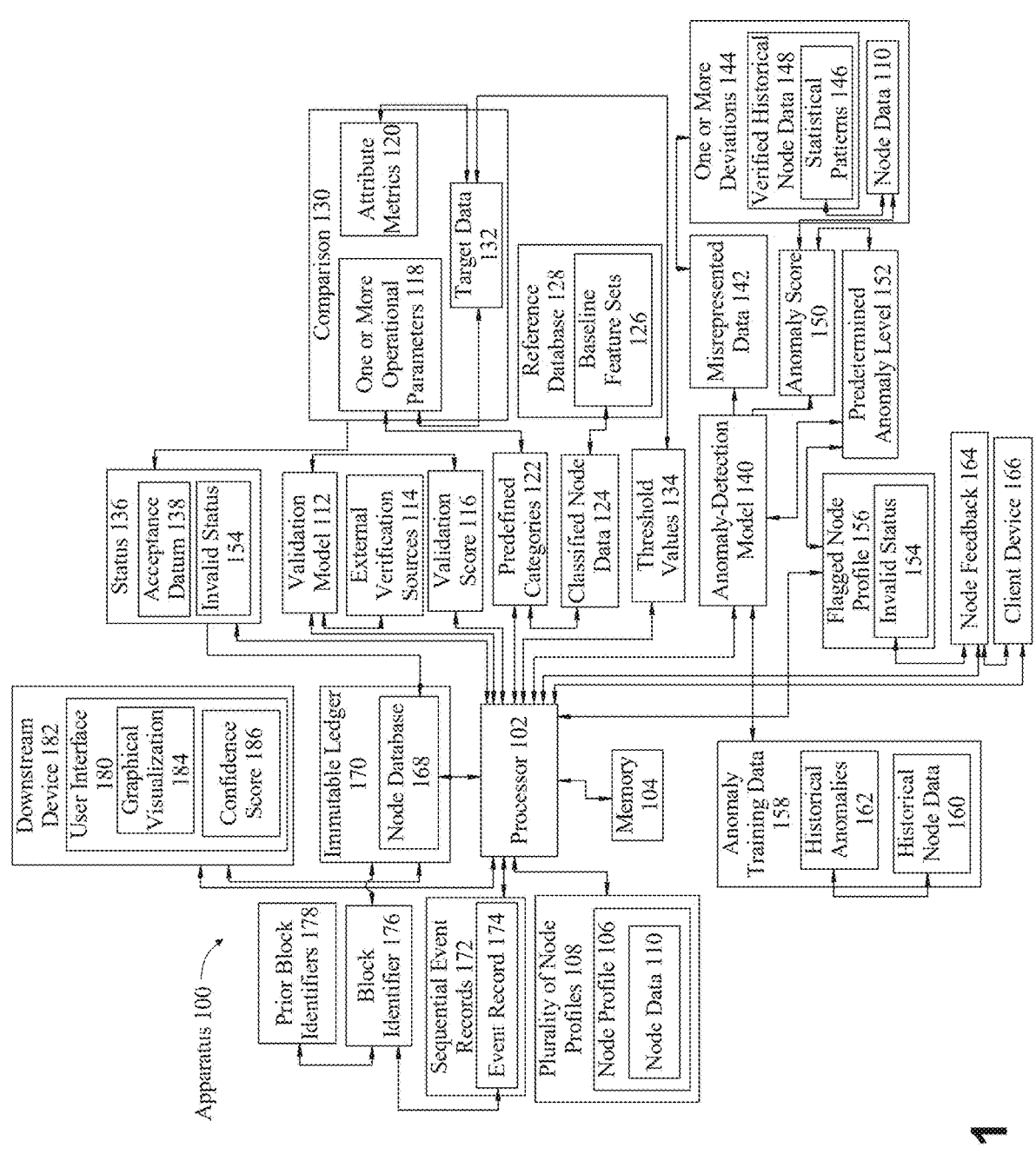
FIG. 1 is a block diagram of an apparatus for generating a node database.

Referring now to FIG. 1, an exemplary embodiment of apparatus 100 for generating a node database is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 May include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive a node profile 106 of a plurality of node profiles 108, wherein the node profile 106 comprises a node data 110. As used in this disclosure, a "node profile" is a structured collection of information associated with a particular node. In an embodiment, the node profile 106 may correspond to a client such as a law firm and include information relating to the firm's identity, operations, and performance. In a non-limiting example, the node profile 106 may instead represent another type of corporation or entity, such as a hospital, and include information about departments, staff levels, or service outputs. Without limitation, the node profile 106 may further correspond to additional types of organizations, including financial institutions, universities, or energy companies, and may capture data relevant to their respective industries. As used in this disclosure, "node data" is individual data elements, attributes, or metrics that describe the characteristics, behaviors, or operational parameters 118 of the node. In an embodiment, node data 110 associated with a law firm may include identifiers such as the firm name, registration number, or office locations. In a non-limiting example, node data 110 associated with a hospital may include measures such as number of beds, patient throughput, or certifications held by the institution. Without limitation, node data 110 for other organizations may include financial records, compliance documentation, or industry-specific performance metrics that provide a detailed view of the node within its operational context.

In an embodiment, the processor 102 may be a dedicated hardware server operating in an enterprise data center. In a non-limiting example, the processor 102 may be a virtualized machine instance deployed in a cloud computing environment to scale dynamically with incoming node profiles 108. Without limitation, the processor 102 may also be realized as a distributed ledger node configured to receive and log node profiles 108 as part of a blockchain transaction flow. In an embodiment, the node profile 106 being received may include identifiers such as registration numbers, organizational names, or office locations. In a non-limiting example, the profile may further comprise operational metrics such as staff counts, throughput measures, or service utilization data. Without limitation, additional content may include compliance attributes, historical records, or third-party validation sources that support accurate downstream processing. In an embodiment, receipt of the node profile 106 may occur during client onboarding workflows where information is captured directly into the system. In a non-limiting example, the profile may be transmitted during routine synchronization events when updated information is sent from external systems. Without limitation, the system may initiate the process on demand when anomalies are detected, requiring immediate re-validation of a node's information. In an embodiment, the technical mechanisms for profile receipt may include secure API calls over HTTPS. In a non-limiting example, middleware such as Apache Kafka or RabbitMQ may manage profile ingestion in streaming data pipelines. Without limitation, blockchain frameworks such as Hyperledger Fabric may be integrated to cryptographically log each profile with immutable traceability. In an embodiment, the purpose of receiving node profiles 108 is to enable reliable classification and validation for subsequent database generation. In a non-limiting example, this may support compliance oversight and reporting obligations. Without limitation, the process ensures integrity and accountability by creating a trusted repository of verified node information. In an embodiment, the node profile 106 corresponds to a law firm and is transmitted to the processor 102 as a structured digital record. The processor 102 may obtain the node profile 106 from a local memory 104, a database, or a remote server via a communication interface. Upon receipt, the processor 102 parses the node profile 106 into its constituent node data 110 elements and stores the elements in accessible memory 104 for subsequent use. In a non-limiting example, the node profile 106 of a law firm may include node data 110 such as the firm name, its registration number, the geographic locations of its offices, and the number of attorneys employed. The processor 102 may receive this information in a standardized format, separate the fields into individual data objects, and associate the data with identifiers in a relational database. Once stored, the processor 102 may further analyze the node data 110 to assess firm operations, generate comparative benchmarks across multiple law firms, or provide inputs to other analytic modules of the system. In a non-limiting example, the law firm node profile 106 may be transmitted from a remote server to the processor 102 over a secure network connection such as an encrypted internet protocol channel or a private virtual network. The transmission may occur in the form of a structured data file such as an XML or JSON object containing the node data 110 fields for the law firm. Upon arrival, the communication interface delivers the structured data file to the processor 102, which parses the file and extracts the node data 110 into memory 104. Without limitation, the processor 102 may also receive the node profile 106 through a direct data feed such as an application programming interface call to an external system that maintains law firm records. In such an embodiment, the application programming interface response provides the node data 110 elements including the firm name, registration number, office locations, and attorney headcount in a machine readable format. The processor 102 then processes these data elements for storage and analysis.

With continued reference to FIG. 1, the at least a processor 102 is further configured to validate, using a validation model 112, the node data 110 by cross-referencing the node data 110 with external verification sources 114 and assigning a validation score 116 to the node profile 106 as a function of consistency between the node data 110 and the external verification sources 114. As used in this disclosure, a "validation model" is a computational framework, algorithm, or set of rules executed by the processor 102 that evaluates the accuracy of node data 110. In an embodiment, the validation model 112 may include statistical methods, machine learning algorithms, heuristic rules, and the like, that assess whether individual node data 110 align with known patterns, standards, or reference data. As used in this disclosure, "external verification sources" are information systems that exist outside of the apparatus 100 and provide independent information that can be used to confirm or refute the accuracy of the node data 110. In an embodiment, external verification sources 114 may include government registries, regulatory filings, industry databases, publicly available records, and the like. As used in this disclosure, a "validation score" is a numerical measure assigned by the processor to a node profile 106 that represents the degree of consistency between the node data and the external verification sources 114. In an embodiment, the validation score 116 may be expressed as a probability value, a percentage, or a scaled rating that indicates the likelihood that the node data 110 are accurate and reliable. In a non-limiting example, where the node profile 106 corresponds to a law firm, the validation model 112 may check the firm name and registration number against a government business registry to ensure that the firm is properly licensed. The processor 102 may also compare the law firm's office locations against postal or geographic information databases to confirm the accuracy of the listed addresses. Each of these comparisons may contribute to the calculation of the validation score 116, where higher consistency with external verification sources 114 results in a higher score. In another non-limiting example, if the node data 110 for a law firm includes attorney headcount, the validation model 112 may cross-reference that figure with disclosures made in bar association membership databases. A high degree of alignment between the reported attorney headcount and the external verification sources 114 would increase the validation score 116, while discrepancies would reduce it. Without limitation, the validation model 112 may further incorporate multiple external verification sources 114 in parallel. For instance, financial information provided in a law firm's node data 110 may be cross-referenced with regulatory filings or industry databases, and client volume data may be compared with case docketing systems or litigation databases. The aggregate results of these cross-references may then be used by the processor 102 to assign a composite validation score 116 that reflects the overall integrity of the node profile 106. In a non-limiting example, a node profile 106 may correspond to a law firm named Smith & Green LLP, where the node data 110 includes the firm name, a registration number of CA123456, an office location at 123 Main Street, Los Angeles, California, and an attorney headcount of eighty five. The validation model 112 is executed by the processor 102 to confirm the node data 110 against external verification sources 114. In operation, the processor 102 may query a government business registry to confirm that the registration number CA123456 is associated with Smith & Green LLP, thereby validating both the firm name and registration number. The processor 102 may further cross-reference the listed office location with a postal service database to confirm that 123 Main Street, Los Angeles, California is a valid address. In addition, the processor 102 may check the attorney headcount against a bar association membership database, which may indicate that eighty three attorneys are actively associated with the firm. The validation model 112 integrates these findings and assigns a validation score 116 based on the degree of consistency. In this example, the firm name and registration number are fully consistent, the office address is confirmed, and the attorney headcount is close to but not identical to the external record. The processor 102 therefore assigns a validation score 116 of ninety two out of one hundred, which reflects a high but not perfect level of consistency between the node data 110 and the external verification sources 114.

With continued reference to FIG. 1, the processor 102 may access external verification sources 114 through one or more communication technologies that provide connectivity between the processor 102 and the data repositories. In an embodiment, the processor 102 may connect to government registries, regulatory filings databases, or industry-maintained records through application programming interfaces that expose structured endpoints. The processor 102 may issue authenticated queries over a secure hypertext transfer protocol connection, receive machine-readable responses in formats such as JavaScript Object Notation or Extensible Markup Language, and parse the returned data for comparison with the node data 110. In a non-limiting example, the processor 102 may access a state bar association membership database through an application programming interface that requires credentials such as an access token or an application key. The processor 102 may transmit a request containing the registration number of a law firm, and the application programming interface may return a list of registered attorneys and affiliated firms. The processor 102 may then parse this returned information and compare it against the attorney headcount or firm name present in the node profile 106. Without limitation, the processor 102 may also access external verification sources 114 through database query languages such as Structured Query Language when the processor 102 is granted access to relational databases maintained on remote servers. In such cases, the processor 102 may execute a query command to retrieve records corresponding to the firm name or registration number, and the results may be delivered through a data communication channel to the processor 102. In another embodiment, the processor 102 may access verification sources that are only available as unstructured records, such as public filings or online directories, by employing web scraping tools or natural language processing modules. In such an implementation, the processor 102 may extract relevant identifiers such as addresses or registration numbers from the unstructured text and normalize the extracted data for cross-referencing with the node data 110. In an embodiment, the processor 102 may use secure networking protocols such as Transport Layer Security to encrypt communications with the external verification sources 114 and may further employ authentication schemes such as token-based authentication or public key certificates to ensure that the data exchange is authorized and protected.

Still referring to FIG. 1, processor 102 is configured to identify one or more operational parameters 118 and attribute metrics 120 of the node data 110. As used in this disclosure, an "operational parameter" is a measurable criterion that reflects the functional performance of a node within its operational environment. In an embodiment, operational parameters 118 provide quantitative or qualitative indicators of how a system, process, or entity performs relative to expected outputs, constraints, or service levels. As used in this disclosure, an "attribute metric" is a measurable indicator that reflects the organizational, cultural, or behavioral characteristics of a node beyond purely technical or operational performance. In an embodiment, attribute metrics 120 provide insight into organizational practices, human factors, governance structures, or strategic alignment that shape how the node operates and interacts within its domain. In a non-limiting example, operational parameters 118 may include system utilization metrics such as CPU cycles consumed, transaction throughput, or latency times;

process compliance records such as adherence to defined workflows or audit trail logs; availability and uptime data such as service interruptions or recovery times; scalability and load metrics such as peak demand compared to average demand; error and exception logs such as failed transactions or anomaly counts; security event data such as authentication records or intrusion detection triggers; resource allocation records such as staffing ratios, machine assignments, or bandwidth distribution; and performance indicators such as task completion times, queue lengths, or throughput efficiency. These operational parameters 118 provide direct evidence of the functional state of the node. In another non-limiting example, attribute metrics 120 may include collaboration metrics such as cross-team communication frequency or shared project contributions; engagement pattern data such as meeting participation or response times; governance adherence records such as compliance with internal codes of conduct or ethical policies; decision-making transparency metrics such as the number of documented rationales or auditability scores; training and learning adoption data such as participation in continuous education programs or certification completions; turnover and retention signals such as employee stability indices or average tenure; diversity and inclusion indicators such as anonymized demographic distributions across organizational tiers; and innovation engagement metrics such as contributions to research and development projects, patent filings, or idea submission events. These attribute metrics 120 provide a view of the organizational and cultural dimensions of the node beyond its technical operations.

With continued reference to FIG. 1, in an embodiment, the identification may be performed by parsing structured records contained within the node profile 106 and mapping the node data fields to predefined categories 122 that correspond to operational parameters 118 or attribute metrics 120. The processor 102 may rely on classification rules or machine learning models that recognize specific data types and automatically assign them to the correct category. In an embodiment, the mapping process may begin with extraction of data elements from the node profile 106, followed by classification of the data elements according to structured taxonomies that may define operational parameters 118 and attribute metrics 120. The mapping process may in some cases rely on a schema-based approach, in which each field of the node profile 106 may be compared to a reference schema that lists known operational and attribute categories. For example, fields labeled as "CPU cycles," "case completion times," or "error counts" may be mapped to operational parameters 118, whereas fields labeled as "employee turnover," "training participation," or "cross-team collaboration frequency" may be mapped to attribute metrics 120. In a non-limiting example, the processor 102 may use rule-based classifiers that may detect data types by their labels, formats, or units of measure. A numeric field labeled "average case completion time (days)" may be recognized by the processor 102 as an operational parameter related to performance indicators. Similarly, a categorical field labeled "employee stability index" may be recognized as an attribute metric related to retention signals. Without limitation, the mapping process may further incorporate machine learning models that May improve classification accuracy. In one embodiment, supervised learning models such as decision trees or neural networks may be trained on historical node data 160 to automatically distinguish between operational parameters 118 and attribute metrics 120. These models may consider metadata such as field labels and content features such as value ranges or contextual relationships. For instance, a model may learn that values expressed as percentages of demographic representation may correspond to diversity attribute metrics 120, whereas values expressed in milliseconds may correspond to operational latency parameters. To support the mapping process, the processor 102 may also employ natural language processing technologies for unstructured node data 110. Internal reports, narrative compliance documents, or textual audit logs may be analyzed using tokenization, entity recognition, and semantic similarity algorithms. Key terms such as "uptime," "latency," or "anomaly counts" may be associated with operational parameters 118, while terms such as "participation," "collaboration," or "diversity" may be associated with attribute metrics 120. The mapping process may additionally rely on database technologies and knowledge graph representations to store associations between data fields and categories. In an embodiment, a knowledge graph may define the relationships between node data 110 attributes and higher-level parameter classes, and the processor 102 may query this knowledge graph to resolve ambiguities and confirm that a given field has been correctly mapped. In some embodiments, the processor 102 may also integrate validation mechanisms into the mapping process. External verification sources 114 may be queried to confirm that a mapped field is consistent with expected data for that category. For example, a workload throughput field classified as an operational parameter may be checked against transaction records in a case management system, while a governance adherence record classified as an attribute metric may be checked against audit trail logs. In an embodiment, the mapping process may employ fuzzy set theory to classify node data 110 as operational parameters 118 or attribute metrics 120 where the categories may not be strictly binary. Fuzzy sets may allow the processor 102 to assign degrees of membership for a given data field across multiple categories, thereby supporting classification in cases where the distinction between operational parameters 118 and attribute metrics 120 may be ambiguous. In a non-limiting example, the processor 102 may analyze a node data field representing "average client response time." This field may share characteristics of both operational performance, such as latency, and cultural engagement, such as responsiveness of staff. Using fuzzy set membership functions, the processor 102 may assign a membership value of 0.7 to the operational parameter category and 0.5 to the attribute metric category. The processor 102 may then apply fuzzy inference rules to determine how to treat this data field during subsequent analysis. Without limitation, fuzzy sets may further be used to capture the variability of human-centered attribute metrics 120. For example, a law firm's diversity index may not always map cleanly to a single attribute metric category. The processor 102 may assign partial membership across categories such as governance adherence, cultural inclusivity, and organizational stability, with membership degrees calculated by applying fuzzy logic to normalized demographic ratios. The processor 102 may implement the fuzzy set embodiment by employing fuzzy membership functions such as triangular, trapezoidal, or Gaussian functions. These membership functions may be applied to continuous or categorical data values, and the resulting membership degrees may be stored in a knowledge graph or rule-based inference engine. The processor 102 may also use fuzzy operators such as union, intersection, or complement to refine the classification when multiple candidate categories overlap. In another non-limiting example, the processor 102 may process a law firm node profile 106 that includes "average case completion time," which may primarily indicate an operational parameter but may also be influenced by organizational practices such as collaboration and staffing ratios. The processor 102 may use fuzzy logic to assign a high membership value to the operational category and a smaller but non-zero membership value to the attribute category, thereby preserving the nuanced contribution of the data field to both dimensions. This embodiment may be advantageous in domains where node data 110 contain overlapping or context-dependent meanings, allowing the system to maintain flexibility and robustness in the mapping process rather than forcing strict categorization.

With continued reference to FIG. 1, in a non-limiting example, where the node profile 106 corresponds to a law firm, the processor 102 may identify operational parameters 118 by analyzing resource allocation records and transaction throughput logs stored in the node profile 106. The processor 102 may detect values such as the number of open matters handled per month, average case completion times, or error rates in document filings. These detected fields may then be classified as operational parameters 118 that reflect the firm's functional performance. In another non-limiting example, the processor 102 may identify attribute metrics 120 by analyzing engagement pattern data or collaboration records contained in the node profile 106. The processor 102 may extract fields such as meeting participation rates, attorney turnover rates, or ratios of contributions to shared knowledge repositories. These values may be categorized as attribute metrics 120 that reflect the organizational culture and governance of the law firm. Without limitation, the identification process may further include cross-referencing node data 110 with external verification sources 114 to determine whether a given field belongs to an operational parameter or attribute metric category. For instance, compliance records in the node profile 106 may be validated against regulatory filings, confirming that they represent operational parameters 118, while diversity indices may be corroborated against anonymized workforce data, confirming that they represent attribute metrics 120. In another embodiment, the processor 102 may employ natural language processing techniques to extract operational parameters 118 and attribute metrics 120 from unstructured records. For example, narrative audit logs, internal reports, or policy compliance statements may be parsed to identify keywords and contextual indicators that map to one of the categories. Machine learning classifiers may then assign the extracted data to either operational parameters 118 or attribute metrics 120 based on training data.

With continued reference to FIG. 1, in an embodiment, the training data may comprise a labeled dataset of historical node profiles 108, where individual data fields may be pre-classified as operational parameters 118 or attribute metrics 120 by subject matter experts. Each labeled example may include both the raw field values and metadata such as field names, data types, units of measure, and contextual descriptions. In a non-limiting example, training data for operational parameters 118 may include structured records such as case completion times, transaction throughput, error counts, or uptime percentages, each labeled as belonging to the operational category. Training data for attribute metrics 120 may include fields such as employee turnover rates, diversity ratios, or training participation levels, each labeled as belonging to the attribute category. The classifier may learn to associate certain numerical ranges, formats, and contextual indicators with operational parameters 118, while associating textual or demographic patterns with attribute metrics 120. Without limitation, the training data may be augmented with synthetic examples generated by data simulation techniques. For instance, performance metrics such as simulated throughput values may be produced across a range of scales to broaden the model's understanding of operational parameters 118. Similarly, attribute metrics 120 such as engagement scores or collaboration indices may be synthetically varied to provide the classifier with a wide distribution of cultural and organizational examples. In another embodiment, the training data may be drawn from multiple industries, such as law firms, hospitals, financial institutions, and universities, to ensure that the classifier generalizes across different domains. For example, attorney turnover rate in a law firm and nurse retention rate in a hospital may both be labeled as attribute metrics 120 in the training data, whereas average case completion time in a law firm and average patient throughput time in a hospital may both be labeled as operational parameters 118. The training data may include negative examples, where ambiguous fields are labeled with both categories under fuzzy membership rules. These examples may allow the classifier to learn how to assign partial membership or resolve uncertainty during classification. In some embodiments, the training data may further be enriched with external verification records. For instance, government registries, bar association databases, or regulatory filings may provide authoritative labels for operational compliance data, while internal governance policies or survey results may provide labels for attribute metrics 120. The inclusion of such external verification data may improve classifier accuracy by grounding the training set in validated examples.

With continued reference to FIG. 1, the at least a processor 102 may be further configured to identify the one or more operational parameters 118 and the attribute metrics 120 by classifying the node data 110 into predefined categories 122, comparing classified node data 124 with baseline feature sets 126 stored in a reference database 128, and identifying the one or more operational parameters 118 and the attribute metrics 120 based on the comparison 130. As used in this disclosure, "predefined categories" are classification groupings that may be established in advance to organize node data 110 into meaningful types. In an embodiment, a meaningful type of category may include operational parameters 118 or attribute metrics 120. In an embodiment, predefined categories 122 may be expressed as taxonomies, schemas, or rule sets that specify which data elements are expected to belong to each group. As used in this disclosure, a "taxonomy" is a hierarchical classification structure that may organize node data 110 into categories and subcategories according to conceptual relationships. In an embodiment, a taxonomy may define parent categories such as "operational parameters" and "attribute metrics," along with child categories such as "performance indicators" or "collaboration metrics." As used in this disclosure, a "schema" is a structured representation of data. Without limitation, a schema may specify the format, labels, relationships, and permissible values for node data elements. In an embodiment, a schema may define the expected fields of a node profile 106, such as "firm name," "case completion time," or "attorney turnover rate," and may prescribe rules for how each field is stored, interpreted, and validated. As used in this disclosure, a "rule set" is a collection of logical conditions, constraints, or decision criteria that may guide the classification of node data into predefined categories 122. In an embodiment, a rule set may include conditional statements such as "if value is expressed in milliseconds, then classify as latency parameter" or "if value represents demographic distribution, then classify as diversity metric." In an embodiment, processor 102 may rely on taxonomies, schemas, or rule sets to classify node data 110 into predefined categories 122. The taxonomy may provide the hierarchical structure that organizes high-level categories and their subcategories, the schema may provide the structural blueprint that defines what data elements are expected and how they are formatted, and the rule set may provide the logical instructions that determine how the data elements are mapped to the categories. In a non-limiting example, a taxonomy may define "operational parameters" as a parent class with subcategories including system utilization, process compliance, and performance indicators. The taxonomy may also define "attribute metrics" as a parent class with subcategories including collaboration, engagement, and governance adherence. The processor 102 may use this taxonomy to navigate the classification hierarchy when assigning data fields. In another non-limiting example, a schema for a law firm node profile 106 may specify that fields such as "average case completion time," "document error rate," and "uptime percentage" are numerical values expected to be stored as floating-point data types, whereas fields such as "attorney turnover rate" or "diversity ratio" are percentage values expressed as normalized fractions. The schema may prescribe metadata such as allowable ranges and units of measure. Without limitation, a rule set may then apply logical conditions to the incoming node data 110. For instance, the rule set may state that "average case completion time" belongs to the operational parameter category because its unit of measure is time and its baseline distribution aligns with performance indicators. The same rule set may also state that "attorney turnover rate" belongs to the attribute metric category because it reflects organizational stability rather than technical throughput. Without limitation, by combining taxonomies, schemas, and rule sets, the processor 102 may create a multi-layered classification process. The taxonomy may provide the conceptual hierarchy, the schema may ensure structural consistency, and the rule set may enforce logical decision-making. Together, these components may ensure that node data 110 are consistently and accurately identified as either operational parameters 118 or attribute metrics 120.

With continued reference to FIG. 1, as used in this disclosure, "baseline feature sets" are characteristic patterns associated with known examples of operational parameters 118 or attribute metrics 120. Without limitation, baseline feature sets 126 may be used as reference points for classification of the. In an embodiment, baseline feature sets 126 may include statistical distributions, expected ranges, structural formats, or semantic markers that distinguish one category of data from another. As used in this disclosure, a "reference database" is a data repository that may store baseline feature sets 126, predefined categories 122, and historical examples of classified node data 124 for use by the processor 102 during analysis. In an embodiment, the reference database 128 may include labeled training sets, domain-specific benchmarks, verification records obtained from internal or external sources, and the like. In an embodiment, the processor 102 may first parse the node profile 106 to extract individual fields of node data 110. Each field may then be classified into one of several predefined categories 122. The predefined categories 122 may be structured according to taxonomies, schemas, or rule sets that distinguish between operational data types such as throughput, latency, and compliance, and attribute data types such as collaboration, governance, and diversity. The processor 102 may assign each field to the category that best reflects its expected function. Once classified, the processor 102 may represent each data field as a feature vector that may capture statistical, semantic, and contextual characteristics of the field. These extracted features may then be compared against baseline feature sets 126 that are stored in a reference database 128. The reference database 128 may contain previously established benchmarks, labeled training data, and validated examples drawn from historical node profiles or external verification sources 114. The comparison 130 may involve similarity analysis, distance metrics, or threshold evaluations that measure how closely the new data align with the baseline features. In a non-limiting example, a node profile 106 corresponding to a law firm may include a field labeled "average case completion time." The processor 102 may classify this field into the predefined category of performance indicators. The processor 102 may then compare the reported value, such as 45 days, against baseline feature sets 126 in the reference database 128, which may contain distributions of case completion times for comparable firms. If the value falls within the expected baseline range, the processor 102 may identify the field as a valid operational parameter. In another non-limiting example, the same law firm node profile 106 may include a field labeled "attorney turnover rate." The processor 102 may classify this field into the predefined category of retention signals, which may be part of the attribute metric hierarchy. The processor 102 may then compare the reported value, such as 12 percent annually, against baseline feature sets 126 stored in the reference database 128, which may contain turnover benchmarks for law firms of similar size. Based on the comparison 130, the processor 102 may confirm the field as a valid attribute metric, or alternatively flag the field as anomalous if the value significantly deviates from baseline expectations. Without limitation, the identification process may be iterative. The processor 102 may assign preliminary classifications, compare them with baseline features, and refine the identification based on confidence thresholds or fuzzy set membership values. The processor 102 may also incorporate machine learning classifiers trained on the reference database 128 to automatically learn feature-to-category mappings and to improve classification accuracy over time. In another embodiment, the processor 102 may employ similarity measures such as cosine similarity, Euclidean distance, or correlation coefficients to quantify how closely the classified node data 124 align with the stored baseline features. The results of the comparison 130 may then be used to generate confidence scores. Data fields with high similarity to the baseline feature sets 126 may be confirmed as operational parameters 118 or attribute metrics 120, while data fields with lower similarity may be marked for further review or assigned partial membership across categories. Through this process, the processor 102 may identify the one or more operational parameters 118 and the attribute metrics 120 of the node data 110 in a consistent, repeatable, and verifiable manner, leveraging both predefined categories 122 and reference baselines to ensure robust classification across diverse types of node profiles 108.

Still referring to FIG. 1, processor 102 is configured to compare the one or more operational parameters 118 and the attribute metrics 120 with target data 132. As used in this disclosure, "target data" is a structured set of reference values, benchmarks, or desired outcomes that may be used by the processor as a basis for comparison 130 with operational parameters 118 and attribute metrics 120. In an embodiment, target data 132 may include performance thresholds, compliance standards, industry averages, contractual obligations, or strategic objectives. In another embodiment, target data 132 may further include qualitative or relational indicators such as the presence of a strong client, where the client relationship itself may function as a benchmark of organizational success or stability. In a non-limiting example, where the node profile 106 corresponds to a law firm, the processor 102 may identify operational parameters 118 such as average case completion time and compare them against target data 132 specifying a threshold of thirty days. If the law firm reports an average of forty-five days, the processor 102 may determine that the operational performance falls short of the target. Similarly, the processor 102 may identify an attribute metric such as attorney turn-over rate and compare it against target data 132 specifying an organizational objective of less than eight percent annual turnover. If the turnover rate is twelve percent, the processor 102 may flag the metric as misaligned with the target. Without limitation, target data 132 may also include indi-cators of relational or market strength such as the presence of a strong client. For example, the processor 102 may identify in the node profile 106 that the law firm represents a leading multinational corporation. The processor 102 may compare this information against target data 132 that values or prioritizes strong client relationships, and the presence of such a client may positively influence the identification process, offsetting deficiencies in other parameters. In another embodiment, the processor 102 may consider strong client representation as a target data 132 feature in compos-ite scoring. For instance, even if operational parameters 118 such as case completion time fall outside the desired target, the identification of a high-value client may increase the overall assessment score because the client relationship serves as an indicator of organizational credibility and competitive strength. Without limitation, by incorporating both quantitative targets and qualitative targets such as the presence of strong clients, the processor 102 may generate a balanced assessment of node profiles 108, reflecting both operational efficiency and relational value.

With continued reference to FIG. 1, the at least a proces-sor 102 may be further configured to compare the one or more operational parameters 118 and the attribute metrics 120 with the target data 132 by retrieving threshold values 134 associated with the target data 132 and determining whether the one or more operational parameters 118 and the attribute metrics 120 satisfy the threshold values 134. As used in this disclosure, "threshold values" are predetermined numerical limits, categorical criteria, or benchmark condi-tions associated with target data 132 that may be used by the processor 102 to determine whether operational parameters 118 or attribute metrics 120 meet, exceed, or fall short of expected standards. In an embodiment, threshold values 134 may include absolute values such as "30 days," ranges such as "between 90 and 95 percent," or qualitative conditions such as "presence of at least one strong client." In an embodiment, the processor 102 may retrieve threshold val-ues 134 from a reference database 128, a configuration file, or an external source such as an industry benchmark reposi-tory. Once retrieved, the processor 102 may use these threshold values 134 as decision points for evaluating node data 110. If the operational parameters 118 and attribute metrics 120 equal or exceed the threshold values 134, the processor 102 may determine that the target has been satisfied. If the node data 110 fall below the threshold, the processor 102 may determine that the target has not been satisfied. In a non-limiting example, if the node profile 106 corresponds to a law firm, the processor 102 may evaluate an operational parameter such as average case completion time. The associated threshold value may be defined in the target data 132 as 30 days. If the law firm reports a case completion time of 28 days, the processor 102 may determine that the parameter satisfies the threshold. Conversely, if the reported time is 45 days, the processor 102 may determine that the threshold is not satisfied. In another non-limiting example, the processor 102 may evaluate an attribute metric such as attorney turnover rate. The threshold value may be defined in the target data 132 as less than 8 percent annually. If the law firm reports a turnover rate of 6 percent, the processor 102 may conclude that the threshold is satisfied. If the rate is 12 percent, the threshold may be deemed not satisfied. Without limitation, threshold values 134 may also include qualitative conditions. For instance, a law firm's node profile 106 may indicate that the firm represents a strong client, such as a Fortune 500 company. The target data 132 may include a threshold condition requiring the presence of at least one strong client to demonstrate business stability. In this case, the processor 102 may evaluate the attribute metric of client representation against the threshold and determine that the law firm satis-fies the condition. In another embodiment, the processor 102 may employ composite threshold evaluations. For example, the processor 102 may evaluate multiple operational param-eters 118, such as uptime percentage and error rate, together against threshold ranges that define acceptable service qual-ity. Similarly, multiple attribute metrics 120, such as gov-ernance adherence and collaboration frequency, may be evaluated against thresholds that represent organizational health. The processor 102 may then assign a composite determination indicating whether the node profile 106 as a whole satisfies the collection of threshold values 134. The use of threshold values 134 may enable the processor 102 to translate raw node data 110 into determinations that reflect compliance, performance, or strategic alignment. Threshold values 134 may be static, where they are fixed in advance, or dynamic, where they are updated over time based on evolving industry standards, regulatory requirements, or organizational goals.

Still referring to FIG. 1, processor 102 is configured to determine, using a comparison 130 of the one or more operational parameters 118 and the attribute metrics 120 with target data 132, a status 136 of the node profile 106. As used in this disclosure, a "comparison" is an analytical operation performed by the processor to evaluate a relation-ship. In an embodiment, the comparison 130 may include an evaluation of the relationship between identified operational parameters 118 and attribute metrics 120 and corresponding elements of target data 132. In an embodiment, a comparison 130 may include determining whether values fall within ranges, exceed thresholds, or satisfy qualitative conditions defined by the target data 132. As used in this disclosure, a "status" is an outcome assigned to a node profile 106 by the processor based on the results of the comparison 130. In an embodiment, the status 136 may indicate whether the node profile 106 meets, exceeds, or fails to meet the requirements of the target data 132, and may be expressed as a categorical label (such as "compliant" or "non-compliant"), a tiered rating (such as "high," "medium," or "low"), a numerical score, and the like. In an embodiment, the processor 102 may first retrieve target data 132 and associated threshold values 134, then compare each operational parameter and attribute metric against these benchmarks. The outcome of the comparison 130 may serve as input to a decision model that assigns a status 136 reflecting the overall alignment of the node profile 106 with the target data 132. In a non-limiting example, where the node profile 106 corresponds to a law firm, the processor 102 may compare an operational parameter such as average case completion time with target data 132 specifying a threshold of 30 days. If the reported completion time is 28 days, the comparison 130 may result in a favorable outcome. The processor 102 may also compare an attribute metric such as attorney turnover rate with target data 132 specifying a threshold of less than 8 percent. If the reported turnover rate is 12 percent, the comparison 130 may result in an unfavorable outcome. Based on the aggregate results of these comparisons, the processor 102 may assign a status 136 such as "partially compliant." Without limitation, the status 136 may incorporate qualitative dimensions of the target data 132, such as whether the node profile 106 demonstrates the presence of a strong client. For example, if the law firm represents a Fortune 500 company, the comparison 130 may result in a favorable outcome for the client relationship metric, and this outcome may positively influence the overall status 136 of the node profile 106. In another embodiment, the processor 102 may assign the status 136 as a numerical score by weighting the results of multiple comparisons. For example, operational parameters 118 may account for 60 percent of the status 136 determination, while attribute metrics 120 may account for 40 percent. The weighted results may then be summed to produce a composite status score, such as 85 out of 100. The status 136 may further be dynamic and may change as new data are received or as target data 132 evolve. In such embodiments, the processor 102 may periodically repeat the comparison 130 and update the assigned status 136 to reflect the current condition of the node profile 106. Through this process, the comparison 130 of operational parameters 118 and attribute metrics 120 with target data 132 may allow the processor 102 to determine a status 136 that serves as a concise indicator of the reliability, performance, or compliance of the node profile 106 within its operational context.

With continued reference to FIG. 1, the status 136 of the node profile 106 may include an acceptance datum 138. As used in this disclosure, an "acceptance datum" is a data element or indicator that may represent whether the status 136 of a node profile satisfies predetermined acceptance conditions associated with target data 132. In an embodiment, the acceptance datum 138 may function as a binary or categorical marker, such as "accepted" or "rejected," or as a graded measure indicating the degree to which the node profile 106 meets acceptance criteria. In an embodiment, the processor 102 may generate the acceptance datum 138 after comparing operational parameters 118 and attribute metrics 120 with target data 132 and determining whether the resulting status 136 meets minimum acceptance thresholds. The acceptance datum 138 may then be stored within the node profile 106 or communicated to downstream systems for decision-making. In a non-limiting example, if the node profile 106 corresponds to a law firm, the processor 102 may evaluate operational parameters 118 such as average case completion time and attribute metrics 120 such as attorney turnover rate. If both satisfy target thresholds, the processor 102 may assign an acceptance datum 138 of "accepted," indicating that the law firm meets the criteria for inclusion in a trusted network. Alternatively, if one or more critical thresholds are not met, such as turnover rate exceeding the target, the processor 102 may assign an acceptance datum 138 of "rejected." Without limitation, the acceptance datum 138 may also be expressed as a score or probability. For instance, the processor 102 may determine that a node profile 106 has an 85 percent likelihood of satisfying acceptance conditions and may store this probability as the acceptance datum 138. In another embodiment, the acceptance datum 138 may include categorical labels such as "conditionally accepted" or "pending verification" to capture intermediate states. The acceptance datum 138 may further be updated over time. As new data are ingested and comparisons with target data 132 are repeated, the processor 102 may revise the acceptance datum 138 to reflect the current status 136 of the node profile 106. This may allow the acceptance datum 138 to serve as a real-time or near real-time indicator of whether a node remains compliant with evolving acceptance conditions.

With continued reference to FIG. 1, the at least a processor 102 may be further configured to flag, using an anomaly-detection model 140, misrepresented data 142 of the node profile 106, wherein the anomaly-detection model 140 is configured to flag the misrepresented data 142 of the node profile 106 by detecting one or more deviations 144 between the node data 110 and statistical patterns 146 of verified historical node data 148, assigning an anomaly score 150 to the node profile 106, flagging the node profile 106 where the anomaly score 150 exceeds a predetermined anomaly level 152, and generating an invalid status 154 based on a flagged node profile 156. As used in this disclosure, an "anomaly-detection model" is a computational framework, algorithm, or process executed by the processor 102 that may be configured to identify unusual, inconsistent, or suspicious data patterns within a node profile 106 relative to expected norms. As used in this disclosure, "misrepresented data" is node data that may be inaccurate, incomplete, falsified, or inconsistent with verified sources or expected patterns. Without limitation, misrepresented data 142 may impair the reliability of the node profile 106. As used in this disclosure, a "deviation" is a measurable difference between a value contained in node data and a corresponding value or range established by a statistical pattern of verified historical node data 148. As used in this disclosure, a "statistical pattern" is a distribution derived from verified historical node data 148. Without limitation, the statistical pattern may serve as a reference for detecting anomalies. As used in this disclosure, "verified historical node data" is node data collected from past profiles that has been validated against external verification sources 114 or otherwise confirmed as accurate. Without limitation, verified historical node data 148 may be used to establish statistical patterns 146. As used in this disclosure, an "anomaly score" is a numerical measure assigned by the processor 102 that may quantify the degree of deviation 144 between node data and statistical patterns 146 of verified historical node data 148. As used in this disclosure, a "predetermined anomaly level" is a threshold value established in advance. In an embodiment, the predetermined anomaly level 152 may define the point at which an anomaly score 150 indicates misrepresentation or inconsistency. As used in this disclosure, an "invalid status" is a classification assigned to a node profile when the anomaly-detection model 140 determines that the profile contains misrepresented data 142 sufficient to disqualify it from acceptance or reliability. As used in this disclosure, a "flagged node profile" is a node profile identified by the processor as containing potential misrepresented data 142 based on anomaly detection analysis, requiring further review or corrective action. In an embodiment, the anomaly-detection model 140 may analyze incoming node data fields and compare them against statistical patterns 146 derived from verified historical node data 148. The model may identify deviations 144 where individual values fall outside expected ranges or where combinations of values appear inconsistent with known correlations. In a non-limiting example, where the node profile 106 corresponds to a law firm, the processor 102 may examine an operational parameter such as average case completion time. Verified historical node data 148 for comparable firms may show a statistical pattern in which completion times range from 30 to 60 days. If the law firm reports a completion time of 5 days, the processor 102 may register a deviation 144. Similarly, if the law firm reports attorney turnover at 0 percent for ten consecutive years, the anomaly-detection model 140 may identify the pattern as inconsistent with verified historical data. The anomaly-detection model 140 may then calculate an anomaly score 150 based on the number and magnitude of the deviations 144. If the anomaly score 150 exceeds a predetermined anomaly level 152, such as a threshold of 0.8 on a scale from 0 to 1, the processor 102 may flag the node profile 106 as potentially containing misrepresented data 142. Once flagged, the processor 102 may generate an invalid status 154 for the node profile 106. The invalid status 154 may indicate that the node profile 106 cannot be trusted for acceptance, benchmarking, or further analysis until the flagged data have been reviewed and verified. In another embodiment, the invalid status 154 may trigger automated workflows, such as requesting additional documentation, sending alerts to administrators, or excluding the node profile 106 from downstream decision-making processes. Without limitation, the anomaly-detection model 140 may rely on statistical techniques such as z-score analysis, clustering, or probabilistic modeling, or may incorporate machine learning methods such as autoencoders or one-class support vector machines to detect deviations 144. The verified historical node data 148 may be continuously updated so that statistical patterns 146 remain relevant, and the predetermined anomaly level 152 may be dynamically adjusted based on evolving tolerance for risk or data variability. Through this approach, the processor 102 may ensure that misrepresented or suspicious data is systematically flagged, scored, and assigned an invalid status 154, thereby preserving the reliability and integrity of node profile 106 analysis.

With continued reference to FIG. 1, the at least a processor 102 may be further configured to train the anomaly-detection model 140 using anomaly training data 158 comprising historical node data 160 corresponding to historical anomalies 162. As used in this disclosure, "anomaly training data" is a curated dataset that may be used by the processor 102 to train an anomaly-detection model 140, where the dataset includes examples of both normal node data and anomalous node data. The anomaly training data 158 may provide labeled instances that enable the model to learn how to distinguish misrepresented or suspicious patterns from expected patterns. As used in this disclosure, "historical node data" is node data collected from previously processed node profiles, which may include both validated data and data later determined to be anomalous. Historical node data 160 may capture the operational parameters 118 and attribute metrics 120 of nodes over time and may serve as the foundation for identifying trends and statistical patterns 146. As used in this disclosure, "historical anomalies" are instances of past node data that were determined to be inaccurate, misrepresented, inconsistent, or otherwise untrustworthy based on verification, threshold evaluation, or anomaly detection processes. Historical anomalies 162 may include outliers, falsified values, or extreme deviations 144 from statistical norms. In an embodiment, the processor 102 may assemble anomaly training data 158 by aggregating historical node data 160 collected from multiple node profiles 108 and labeling specific instances that were previously identified as anomalous. The labeled dataset may then be used to train the anomaly-detection model 140 to recognize patterns indicative of misrepresented data 142. In a non-limiting example, where the node profiles 108 correspond to law firms, historical node data 160 may include operational parameters 118 such as case completion times, attorney headcounts, and turnover rates. Historical anomalies 162 may include data points where a firm reported average case completion times of two days, zero turnover for extended periods, or unrealistically high client volumes. These instances may be labeled as anomalies in the training data. The anomaly-detection model 140 may learn from these examples to identify similar suspicious patterns in new node profiles 108. Without limitation, the anomaly training data 158 may also include balanced examples of normal historical node data 160 to ensure that the model learns to differentiate between expected variation and true anomalies. For instance, case completion times between 30 and 60 days may be labeled as normal, while values outside that range may be labeled as anomalies. In another embodiment, the anomaly training data 158 may include not only individual anomalous values but also combinations of values that form anomalous patterns. For example, a law firm reporting low turnover rates in combination with extremely high case throughput may be labeled as a historical anomaly because the combination of values is inconsistent with verified patterns of past node data 110. The processor 102 may employ supervised learning methods, where anomaly training data 158 is explicitly labeled as normal or anomalous, or semi-supervised and unsupervised methods, where the anomaly-detection model 140 may learn boundaries of normal data and identify deviations 144 without explicit labeling. The historical anomalies 162 provide critical examples that anchor the model's ability to assign anomaly scores 150 and determine when new data should be flagged. Through this process, the anomaly-detection model 140 may continuously improve its accuracy in identifying misrepresented data 142 by leveraging anomaly training data 158 derived from historical node data 160 and historical anomalies 162. The iterative inclusion of new anomalies into the training set may allow the model to adapt to evolving patterns of misrepresentation across different node profiles 108.

With continued reference to FIG. 1, the at least a processor 102 may be further configured to generate node feedback 164 associated with an invalidation of the node profile 106 and transmit the node feedback 164 to a client device 166. As used in this disclosure, "node feedback" is information received by the processor 102 that may relate to the outcome of an analysis of a node profile. Node feedback 164 may include a review of anomalies detected, comments explaining an invalid status 154, or recommendations for correction. In an embodiment, node feedback 164 may be generated automatically by the processor 102 or may be created by a person interacting with the system who reviews the anomaly-detection results and provides feedback. As used in this disclosure, a "client device" is any computing device associated with the node. In an embodiment, the client device 166 may be used to prepare and transmit node feedback 164 to the processor 102. In an embodiment, a client device 166 may include a law firm's workstation, laptop, server, or mobile device. The client device 166 may allow a user to review why their node profile 106 was not accepted, generate feedback explaining additional supporting information or corrective actions, and transmit that node feedback 164 back to the processor 102 so that the profile may be refined, corrected, or reconsidered. In an embodiment, the processor 102 may determine that a node profile 106 has been assigned an invalid status 154 and may generate preliminary node feedback 164 that identifies reasons for invalidation. The preliminary node feedback 164 may then be transmitted to a client device 166, such as a law firm's computer system, where a user may review the anomalies or flagged issues. In a non-limiting example, if a law firm's node profile 106 reports an attorney turnover rate of zero percent for an extended period, the anomaly-detection model 140 may flag this as inconsistent with verified historical data. The processor 102 may generate node feedback 164 that describes this inconsistency and transmit it to the firm's client device 166. A user at the firm may review the feedback, determine whether the reported value was misrepresented or requires supporting evidence, and then generate updated node feedback 164 on the client device 166. The updated node feedback 164 may include corrected data or explanatory notes and may be transmitted back to the processor 102 for re-evaluation. Without limitation, node feedback 164 may include multiple layers of information. In one embodiment, feedback may include basic error flags generated automatically by the processor 102, while in another embodiment, a user operating the client device 166 may provide supplemental narrative feedback explaining contextual factors, such as unusual reporting periods or exceptions to industry norms. The processor 102 may receive both types of feedback and incorporate them into subsequent validation or anomaly-detection cycles. In another embodiment, node feedback 164 may include structured correction files transmitted from the client device 166, which may update specific fields in the node profile 106. For example, if an invalidation occurs because of missing compliance records, the client device 166 may transmit additional compliance documentation as node feedback 164. The processor 102 may then validate the new submission and determine whether the corrected profile meets acceptance conditions. Through this feedback exchange, the processor 102 may use node feedback 164, whether self-generated or provided by a user using a client device 166, to refine the evaluation of node profiles 108, ensuring that invalid profiles can be corrected and potentially reclassified as valid over time.

Still referring to FIG. 1, processor 102 is configured to generate a node database 168 as a function of the status 136 of the node profile 106. As used in this disclosure, a "node database" is a structured data repository generated and maintained by the processor 102. Without limitation, the node database 168 may store information about node profiles 108, including their statuses, acceptance determinations, and associated metadata. In an embodiment, the node database 168 may include records of validated node profiles 108, rejected or invalid profiles, anomaly scores 150, and acceptance data. The node database 168 may be implemented as a relational database, a graph database, or a distributed ledger, depending on system requirements. As used in this disclosure, a "relational database" is a structured data management system. In an embodiment, the relational database may organize information into tables composed of rows and columns, where each table may represent a set of related entities and each row may represent an individual record. In an embodiment, a relational database may be queried using Structured Query Language (SQL), and may be suitable for storing node profiles 108 with defined fields such as firm name, status 136, anomaly score 150, and acceptance datum 138. As used in this disclosure, a "graph database" is a database model. Without limitation, the graph database may represent data as nodes, edges, and properties, thereby emphasizing relationships between entities. In an embodiment, a graph database may be suitable for capturing the interconnectedness of node profiles 108, such as law firms linked to their clients, referral partners, or regulatory bodies. The graph model may allow efficient analysis of networks, patterns, and community structures within the referral ecosystem. As used in this disclosure, a "distributed ledger" is a decentralized database system. In an embodiment, the distributed ledge may record transactions or data entries across multiple computing nodes, ensuring that each participant maintains a synchronized and tamper-resistant copy of the data. In an embodiment, a distributed ledger may be permissioned, restricting participation to authorized entities, and may be suitable for recording immutable acceptance decisions, anomaly flags, and admission histories of node profiles 108. In an embodiment, the processor 102 may be configured to implement a hybrid system that combines features of a relational database, a graph database, and a distributed ledger, thereby leveraging the strengths of each structure to manage and govern node profile 106 data. The relational database component may serve as the core repository for structured node profile 106 records. Each profile may be stored in tabular form with fields such as firm name, status 136, anomaly score 150, acceptance datum 138, and timestamps. This structure may enable efficient querying, reporting, and integration with existing enterprise data systems. The graph database component may operate in parallel, modeling the relationships between node profiles 108 and their ecosystem connections. For example, a law firm node may be linked to its clients, referral partners, or industry associations. Edges may store relationship attributes such as frequency of collaboration, strength of partnership, or regulatory affiliations. The graph structure may allow the processor 102 to detect clusters of high-performing firms, identify central nodes in the ecosystem, and uncover potential risks from overly interconnected or anomalous profiles. The distributed ledger component may provide immutable recordkeeping of admission decisions, anomaly flags, and status 136 updates. Each time a node profile 106 is validated, rejected, or updated, a transaction may be written to the permissioned ledger. This record may ensure transparency and accountability in the client selection process, while also preventing tampering or retroactive alteration of decisions. In some embodiments, smart contract functionality may be implemented to automate acceptance workflows or trigger alerts when specific anomaly conditions are met. In a non-limiting example, a law firm may submit a node profile 106 that includes operational parameters 118 and attribute metrics 120. The processor 102 may first validate the fields and store the structured record in the relational database. Next, the processor 102 may update the graph database to reflect the firm's connections to strong clients and its position within the referral network. Finally, once an acceptance or rejection decision is made, the result may be logged into the distributed ledger, ensuring permanent and verifiable tracking of the admission outcome. Without limitation, the hybrid system may allow cross-database integration. The relational database may support efficient queries about performance averages, the graph database may uncover ecosystem trends, and the distributed ledger may guarantee the integrity of final decisions. Together, the hybrid system may ensure that data is accurate, relationally contextualized, and immutably preserved.

With continued reference to FIG. 1, in an embodiment, once the processor 102 evaluates a node profile 106 and determines a status 136, such as valid, invalid, accepted, or rejected, the processor 102 may record the profile information and its status 136 in the node database 168. This storage process may create a structured, searchable repository of node-level information that supports downstream operations, including client selection, auditing, and analytics. In a non-limiting example, the node database 168 may support a client selection process that intentionally restricts admission to law firms meeting defined cultural and operational criteria. The processor 102 may evaluate node profiles 108 against acceptance thresholds and target data 132, and only firms demonstrating high levels of commitment and alignment may receive an accepted status. These accepted statuses may then be stored in the node database 168, thereby curating a client base composed of law firms with proven reliability and cultural alignment. Without limitation, the node database 168 may function as a trust-building mechanism. By limiting acceptance to high-commitment, high-alignment firms, the apparatus 100 may ensure a curated client base that strengthens the reputation and trustworthiness of its referral ecosystem. In an embodiment, the admission data stored in the node database 168 may be maintained in a permissioned ledger system. The permissioned ledger may provide immutable tracking of client acceptance decisions, enabling the system to preserve historical integrity and to demonstrate accountability in client selection. In another embodiment, the node database 168 may integrate anomaly detection results. The processor 102 may append anomaly scores 150 and invalid statuses to node profile 106 records, ensuring that attempts to misrepresent data are tracked. For example, if a law firm reports unrealistic turnover rates or inflated client volumes, the anomaly-detection model 140 may flag the misrepresented data 142 and assign an invalid status 154. This flagged outcome may be recorded in the node database 168, preventing the firm from gaining entry into the curated ecosystem. The node database 168 may further support dynamic updates as node profiles 108 evolve. If a client device 166 transmits corrected data through node feedback 164, and the processor 102 re-evaluates the node profile 106 and assigns a new status 136, the node database 168 may be updated to reflect the corrected admission decision. In this way, the node database 168 may serve as a living repository that adapts to changes while maintaining an immutable record of historical decisions through its ledger implementation. Through this approach, the node database 168 may serve not only as a technical record-keeping structure but also as a governance mechanism that enforces cultural and operational standards for admission, safeguards against misrepresentation, and preserves trust within the referral ecosystem.

Still referring to FIG. 1, processor 102 is configured to generate and transmit an acceptance signal to the node associated with the node profile as a function of the status, wherein the status comprises an acceptance status. As used in this disclosure, an "acceptance signal" is a transmission generated by the processor 102 that communicates the outcome of a comparison between a node profile's operational parameters and attribute metrics and target data. In an embodiment, the acceptance signal may indicate that the node profile is accepted for inclusion in a trusted network. In a non-limiting example, the acceptance signal may indicate that the node profile is rejected or conditionally accepted. Without limitation, the processor 102 may transmit the acceptance signal to the node associated with the node profile, thereby allowing the node to receive a communication reflecting its evaluated status. As used in this disclosure, an "acceptance status" is a classification assigned to a node profile to indicate whether the node profile satisfies acceptance conditions derived from comparison with target data. In an embodiment, the acceptance status may be expressed as a categorical label such as accepted, rejected, or conditionally accepted. In a non-limiting example, the acceptance status may be expressed as a binary marker or a graded measure that reflects the degree of compliance with target thresholds. Without limitation, the acceptance status may form part of the node profile's overall status, and the processor 102 may generate and transmit an acceptance signal to the associated node as a function of the acceptance status.

With continued reference to FIG. 1, in an embodiment, the processor 102 may generate the acceptance signal by evaluating operational parameters and attribute metrics of a node profile against target data and determining whether the node profile satisfies one or more threshold values. In a non-limiting example, the processor 102 may assign a favorable acceptance status when performance measures such as completion time or turnover rate fall within target ranges, and may then encode this determination into a structured digital message that represents the acceptance signal. Without limitation, the generation process may include converting the outcome of the evaluation into a binary marker, a categorical label, or a numerical score that can be transmitted to the node. For example, without limitation, the processor 102 may use application programming interfaces to format the acceptance signal as a JavaScript Object Notation or Extensible Markup Language message for interoperability across distributed systems. In a non-limiting example, the acceptance signal may be transmitted over a secure network connection such as hypertext transfer protocol secure or transport layer security encrypted channels to ensure confidentiality and integrity of the signal. Without limitation, middleware such as Apache Kafka or RabbitMQ may be employed to manage the acceptance signal as part of a streaming data pipeline. In an embodiment, blockchain frameworks such as Hyperledger Fabric may be used to log the transmission of the acceptance signal into a distributed ledger, thereby providing immutable traceability of acceptance outcomes. In a non-limiting example, wireless communication technologies such as low power wide area networks or fifth generation cellular networks may be used to transmit acceptance signals to remote client devices in real time. Without limitation, the processor 102 may implement cryptographic signatures or public key infrastructure to authenticate the acceptance signal, thereby ensuring that only valid and verified determinations are received by the associated node.

Still referring to FIG. 1, processor 102 is configured to store the node database 168 within an immutable ledger 170. As used in this disclosure, an "immutable ledger" is a data structure that records transactions, entries, or decisions in a manner that prevents alteration, deletion, or tampering once the data has been committed. In an embodiment, an immutable ledger 170 may be implemented using distributed ledger technology, blockchain protocols, append-only data stores, and the like, that maintain a verifiable and auditable history of all records. As used in this disclosure, "distributed ledger technology" is a database architecture that maintains records across multiple computing nodes in a synchronized manner, where each participant holds a copy of the ledger. Distributed ledger technology ensures that all updates are validated through consensus mechanisms and that the integrity of the records is preserved across the network. As used in this disclosure, "blockchain protocols" are a class of distributed ledger technology that structure data into sequentially linked blocks, each containing a set of transactions and a cryptographic hash of the previous block. Blockchain protocols guarantee immutability by making it computationally infeasible to alter prior blocks without consensus from the network. As used in this disclosure, "append-only data stores" are data storage systems that allow the addition of new records while prohibiting modification or deletion of existing records. Append-only data stores preserve a chronological sequence of entries and provide an immutable record of all operations. The immutability property may ensure that acceptance decisions, anomaly scores 150, and node statuses remain permanently traceable. In an embodiment, when the processor 102 evaluates a node profile 106 and assigns a status 136 such as valid, invalid, accepted, or rejected, the result may be committed to the immutable ledger 170 as a permanent record. Each entry may include metadata such as timestamps, cryptographic hashes, and identifiers to ensure authenticity and integrity. In a non-limiting example, where the node profile 106 corresponds to a law firm, the processor 102 may validate the firm's operational parameters 118 and attribute metrics 120, assign an acceptance status, and then write this outcome to the immutable ledger 170. The ledger entry may record that Firm A was accepted on a particular date, including the anomaly score 150, the acceptance datum 138, and the thresholds satisfied. This record may not be altered even if Firm A later updates its profile. Instead, subsequent changes may be recorded as new entries appended to the ledger, preserving a full chronological history of the firm's profile evaluations. Without limitation, the immutable ledger 170 may function as a governance mechanism for the referral ecosystem. By ensuring that all acceptance decisions are permanently stored, the ledger may prevent retroactive manipulation of node statuses. In another embodiment, the ledger may be permissioned, such that only authorized parties such as system administrators, auditors, or client reviewers may read or write to it. This approach may allow the system to balance transparency with security. In another embodiment, the immutable ledger 170 may integrate with anomaly detection results. If the processor 102 flags a law firm as misrepresenting data and assigns an invalid status 154, this outcome may be appended to the ledger alongside the justification. The permanent record of the anomaly and invalidation may serve as a safeguard against future attempts to reapply with falsified data. The immutable ledger 170 may further provide an auditable trail for regulatory compliance, client trust, and internal accountability. Each node database 168 entry may be cryptographically linked to prior entries, forming an unbroken chain of custody that verifies the authenticity of the system's admission and rejection decisions.

With continued reference to FIG. 1, the at least a processor 102 may be further configured to store the node database 168 within the immutable ledger 170 by segmenting the node database 168 into sequential event records 172, cryptographically hashing each event record 174 of the sequential event records 172 to generate a block identifier 176, and linking the block identifier 176 with prior block identifiers 178 to form the immutable ledger 170. As used in this disclosure, a "sequential event record" is a data unit representing a chronologically ordered action, update, or decision related to a node profile 106 that is stored in a ledger as part of an ordered sequence. As used in this disclosure, an "event record" is an individual entry within the ledger that contains data related to a single occurrence, such as the assignment of a status 136, the detection of an anomaly, or the acceptance of a node profile 106. As used in this disclosure, a "block identifier" is a cryptographic hash value generated from the contents of an event record 174, which uniquely represents the event record 174 and ensures its integrity. As used in this disclosure, "prior block identifiers" are block identifiers associated with previously stored event records in the ledger that are linked to the current block identifier 176 to maintain a verifiable and immutable chain of records. In an embodiment, the processor 102 may divide the node database 168 into a series of event records, each representing a discrete action or update to a node profile 106. These event records may then be arranged in chronological order, creating sequential event records 172 that capture the progression of the node profile 106 over time. Once segmented, the processor 102 may generate a block identifier 176 for each event record 174 by applying a cryptographic hashing function such as SHA-256. As used in this disclosure, a "cryptographic hashing function" is a mathematical algorithm that transforms input data of arbitrary size into a fixed-size output, known as a hash value, in a manner that is deterministic, collision-resistant, and computationally infeasible to reverse. A cryptographic hashing function may be used by the processor 102 to secure event records when storing the node database 168 in an immutable ledger 170. The function may take the contents of an event record 174, such as the status 136 of a node profile 106, anomaly scores 150, and timestamps, and transform that content into a unique fixed-length hash value. This hash value may act as a digital fingerprint of the record. In an embodiment, common cryptographic hashing functions such as SHA-256 or SHA-3 may be applied. The determinism of the function ensures that identical input always produces the same hash value. The collision resistance ensures that two different inputs are unlikely to generate the same output. The one-way property ensures that the hash value cannot be feasibly used to reconstruct the original input data. In a non-limiting example, when a law firm node profile 106 is accepted into the system, the processor 102 may take the profile's acceptance status, anomaly score 150, and metadata and run them through a cryptographic hashing function. The output hash value may serve as the block identifier 176 for that event record 174. If the record is later altered in any way, even by a single character, the hash value would change, alerting the system to the tampering attempt. Without limitation, the processor 102 may also link block identifiers by embedding the hash value of a prior event record 174 into the input of the next event record's hash computation. This chaining of cryptographic hash values may ensure that the ledger remains immutable, since altering any prior record would invalidate all subsequent hash values. The use of cryptographic hashing functions in this way may provide security, integrity, and auditability for the immutable ledger 170, ensuring that every node profile 106 status 136 and anomaly detection outcome is preserved in a verifiable sequence. The block identifier 176 may serve as a unique fingerprint of the event record 174, ensuring that any attempt to alter the contents of the record would result in a changed hash, thereby revealing tampering. In a non-limiting example, where the node profile 106 corresponds to a law firm, the processor 102 may create sequential event records 172 for the initial submission of the profile, the assignment of an acceptance status, the detection of an anomaly, and the re-evaluation of corrected data. Each of these records may be hashed to generate a block identifier 176. The processor 102 may then link each block identifier 176 to prior block identifiers 178 in order to establish a chain of event records. For example, the block identifier 176 for the re-evaluation event may contain a reference to the block identifier 176 of the anomaly-detection event, thereby creating an immutable sequence. This chaining ensures that the history of the node profile 106 cannot be modified without invalidating the cryptographic structure of the ledger. Without limitation, this process may be implemented using blockchain protocols, append-only data stores, or other distributed ledger technologies. In another embodiment, the processor 102 may replicate the ledger across multiple computing nodes to ensure resilience and redundancy. Through this approach, the processor 102 may ensure that the node database 168 is stored as an immutable sequence of event records, each cryptographically secured and verifiably linked to its predecessors, thereby safeguarding the integrity and auditability of node profile 106 data.

With continued reference to FIG. 1, the at least a processor 102 may be further configured to display, using a user interface 180 of a downstream device 182, the node database 168, wherein displaying the node database 168 further comprises generating a graphical visualization 184, generating a confidence score 186 for each node profile 106 of the plurality of node profiles 108, and displaying the graphical visualization 184 and the confidence score 186. As used in this disclosure, a "user interface" is a collection of hardware and/or software components configured to enable interaction between a user and a computing device, wherein the user interface 180 facilitates the presentation of data to the user and the reception of input from the user. The user interface 180 may include, without limitation, graphical user interfaces, command-line interfaces, application programming interfaces, voice-based interfaces, haptic interfaces, or augmented reality interfaces. A "graphical user interface," as used herein, is a graphical form of user interface 180 that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device 166, and/or graphical user interface. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 182 may include a data structure. As used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 102, wherein elements within graphical user interface may be modified as a result. In some cases, processor 102 may be configured to transmit display device and or the downstream device 182 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device 166, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure. The data structure may retrieve the relevant information such as, text explanations, videos, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface (GUI) that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with apparatus 100. For instance, and without limitation, downstream device 182 may include a remote device and/or apparatus 100. In a non-limiting embodiment, downstream device 182 may be consistent with a computing device as described in the entirety of this disclosure. Without limitation, the downstream device 182 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the node database 168 may include displaying the node database 168 at display device using a visual interface.

With continued reference to FIG. 1, as used in this disclosure, a "graphical visualization" is a visual representation of data that transforms underlying numerical or categorical values into charts, graphs, networks, or other visual formats. Without limitation, the graphical visualization 184 may enable a user to interpret patterns, relationships, and comparisons more efficiently than through raw data alone. As used in this disclosure, a "confidence score" is a numerical value assigned to a node profile 106 that expresses the level of certainty or reliability of its classification, status 136, or evaluation as determined by the processor. In an embodiment, the processor 102 may prepare the contents of the node database 168 for display on a downstream device, such as a workstation, tablet, or mobile device. The processor 102 may generate a graphical visualization 184 that illustrates the distribution, status 136, or network relationships of node profiles 108. For example, a bar chart may show the number of accepted versus rejected profiles, while a network graph may illustrate how accepted law firms are connected to clients and referral partners. In parallel, the processor 102 may generate a confidence score 186 for each node profile 106. The confidence score 186 may reflect how strongly the profile aligns with target data 132, how consistent its attributes are with baseline features, or how likely it is to contain misrepresented data 142. A confidence score 186 may be derived from statistical measures, anomaly detection models, or machine learning classifiers. In a non-limiting example, where the node database 168 contains multiple law firms, the processor 102 may assign a confidence score 186 of 92 percent to a firm that has consistent operational parameters 118, low anomaly scores 150, and strong client representation. Another firm with incomplete compliance documentation and higher anomaly scores 150 may receive a confidence score 186 of 65 percent. These scores may be displayed alongside graphical visualizations to provide users with an interpretable assessment of trustworthiness and reliability. Without limitation, the graphical visualization 184 and confidence score 186 may be combined in an interactive display. A user may click on a node in a network graph to reveal its confidence score 186, anomaly history, and acceptance status. In another embodiment, the visualization may use color coding or size variations to visually encode the confidence score 186, allowing users to quickly identify high-confidence and low-confidence profiles. This approach may enable downstream users, such as administrators, auditors, or clients, to evaluate the node database 168 efficiently. The graphical visualization 184 may highlight macro-level patterns, while the confidence scores may provide micro-level reliability measures for individual node profiles 108. Together, they may enhance decision-making, transparency, and trust in the referral ecosystem.

With continued reference to FIG. 1, the at least a processor 102 may further be configured to display, using the graphical user interface, different interface components to each node profile 106 of the plurality of node profiles 108 as a function of an acceptance signal. As used in this disclosure, "interface components" are graphical elements of a graphical user interface that are selectively presented to node profile 106 as a function of an acceptance signal or related status. In an embodiment, different interface components may include menus, dashboards, toolbars, data visualization panels, and the like, that may be dynamically displayed or hidden based on whether node profile 106 has been approved. In a non-limiting example, the interface components may include restricted access features such as premium reporting modules, collaboration tools, or administrative controls that are only visible to an approved node profile 106. Without limitation, different interface components may also include graphical indicators, badges, or visual overlays that distinguish the approval status of node profile 106. For example, without limitation, the graphical user interface may present advanced customization options, export functions, or content containers exclusively to approved node profiles 106, while non-approved node profiles 106 may be limited to a simplified or restricted presentation of the graphical user interface. Without limitation, the graphical user interface may include a presentation layer that may be dynamically modified as a function of the acceptance signal. In an embodiment, the graphical user interface may display different interface components depending on whether or not node profile 106 has been approved. In a non-limiting example, the graphical user interface may expose advanced functionality, premium dashboards, or enhanced reporting tools only to an approved node profile 106 while displaying a limited view or basic functionality to a non-approved node profile 106. Without limitation, an approved node profile may be presented with interactive features such as customization options, collaboration tools, or data export capabilities that are withheld from a non-approved node profile. For example, without limitation, the graphical user interface may display a badge or status indicator alongside node profile to visually signify the approval status to other participants in the system.

With continued reference to FIG. 1, the at least a processor 102 may further be configured to generate an electronic communication to each node profile 106 of the plurality of node profiles 108 as a function of an acceptance status. As used in this disclosure, an "electronic communication" is a digitally transmitted message generated and delivered by the processor to the node profile 106 as a function of an acceptance status or other system event. In an embodiment, the electronic communication may include an email, a newsletter, a text message, a push notification, an in-application alert, and the like. In a non-limiting example, the electronic communication may include structured content such as hyperlinks, credentials, access tokens, and the like, that provide node profile 106 with enhanced functionality or privileged access. Without limitation, the electronic communication may be formatted as JavaScript Object Notation, Extensible Markup Language, or Hypertext Markup Language to ensure interoperability across platforms. For example, without limitation, the processor may transmit an electronic communication to an approved node profile 106 containing invitations to restricted resources, while transmitting a summary-only communication to a non-approved node profile 106. In an embodiment, an approved node profile 106 may receive electronic communications with enhanced detail, embedded multimedia, or privileged access information. In a non-limiting example, a non-approved node profile 106 may receive communications containing general updates, reduced access offers, or redirection to application resources encouraging compliance with acceptance requirements. Without limitation, the processor may be configured to transmit invitations, credentials, or content links in the electronic communication to approved node profiles 106 while limiting access for non-approved node profiles 106.

With continued reference to FIG. 1, the at least a processor 102 may further be configured to generate the acceptance signal for each node profile 106 of the plurality of node profiles 108 as a function of a preferred communication method of node profile 106. As used in this disclosure, a "preferred communication method" is an option or setting stored in node profile 106 that identifies how node profile 106 elects to receive electronic communications. In an embodiment, the preferred communication method may indicate a choice of delivery channel such as email, text message, mobile application push notification, instant messaging service, and the like. In a non-limiting example, the preferred communication method may specify enterprise-level delivery using application programming interface calls to backend systems. Without limitation, the preferred communication method may include protocol-level preferences such as secure sockets layer, hypertext transfer protocol secure, or message queue transport for receiving acceptance signals. For example, without limitation, node profile 106 may store a preferred communication method that directs the processor to transmit acceptance signals as short message service notifications to a registered mobile device. Without limitation, the processor may adapt the acceptance signal to align with communication preferences stored in the node profile. In an embodiment, the processor may transmit the acceptance signal as a push notification when node profile 106 has indicated mobile delivery as a preferred communication method. In a non-limiting example, the processor may configure the acceptance signal to be delivered as an email, a text message, or an in-application alert depending on the designated preferences of node profile 106. Without limitation, an enterprise node profile 106 may configure its profile to receive acceptance signals through application programming interface calls to backend systems, while an individual node profile 106 may configure its profile to receive acceptance signals via short message service or instant messaging platforms.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
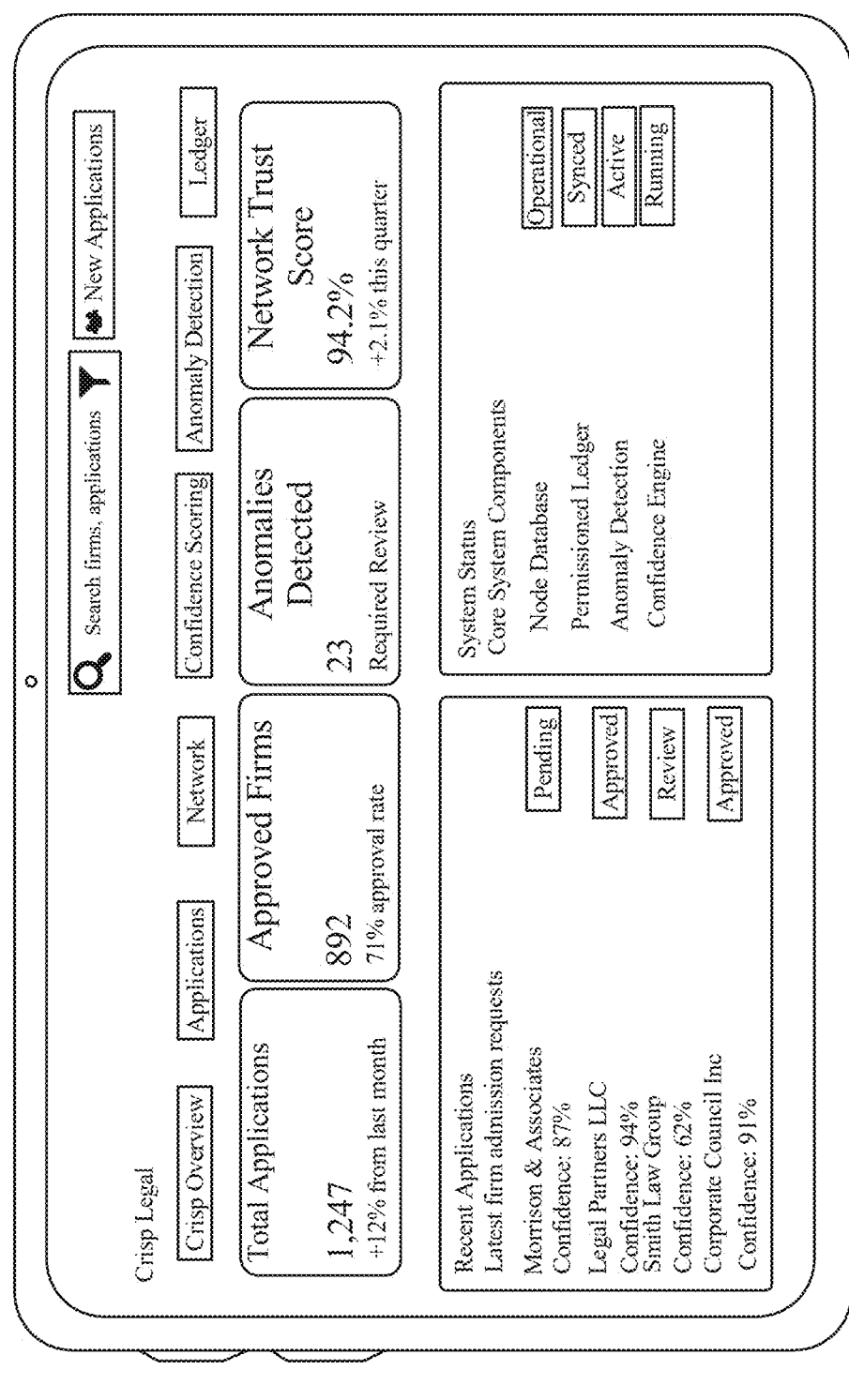
FIG. 2 is an exemplary illustration of a graphical user interface.

Referring now to FIG. 2, an exemplary illustration 200 of a graphical user interface displaying a graphical visualization. Without limitation, the interface may present both aggregate system-level metrics and individual node profile information through a structured and interactive display. In the upper portion of the interface, summary panels may provide graphical visualizations of key statistics. These panels may include the total number of applications submitted, the number of approved firms, the number of anomalies detected, and a network trust score. Each panel may display numerical values together with contextual indicators, such as percentage approval rates, relative changes from prior periods, or notes indicating when further review is required. In a non-limiting example, the network trust score may be shown as 94.2 percent with a change indicator of plus 2.1 percent for the quarter, thereby reflecting the system's ability to visually communicate trustworthiness trends across the referral ecosystem. The interface may further include a recent applications section, where individual law firm node profiles may be listed with corresponding confidence scores and current status indicators. For example, Morrison & Associates may be listed with a confidence score of 87 percent and a pending status, while Legal Partners LLC may be listed with a confidence score of 94 percent and an approved status. This layout may allow users to interpret individual node-level evaluations alongside their assigned confidence scores and statuses. On the right-hand side of the interface, a system status panel may display operational indicators for the core system components. These components may include the node database, the permissioned ledger, the anomaly detection engine, and the confidence scoring engine. Each component may be shown with a corresponding operational status, such as "Operational," "Synced," "Active," or "Running," thereby enabling the user to confirm system integrity in real time. In some embodiments, the interface may allow a downstream user to filter between different modes such as overview, applications, network, confidence scoring, anomaly detection, and ledger. Each mode may adjust the visualization to emphasize different aspects of the node database, ranging from high-level network trust scores to detailed anomaly reviews. Through this configuration, the graphical user interface may provide both macro-level insights into the health of the ecosystem and micro-level details about individual node profiles. The combination of graphical visualization and confidence scoring displayed in this manner may support efficient decision-making, transparency, and trust across the system.

Figure 3:
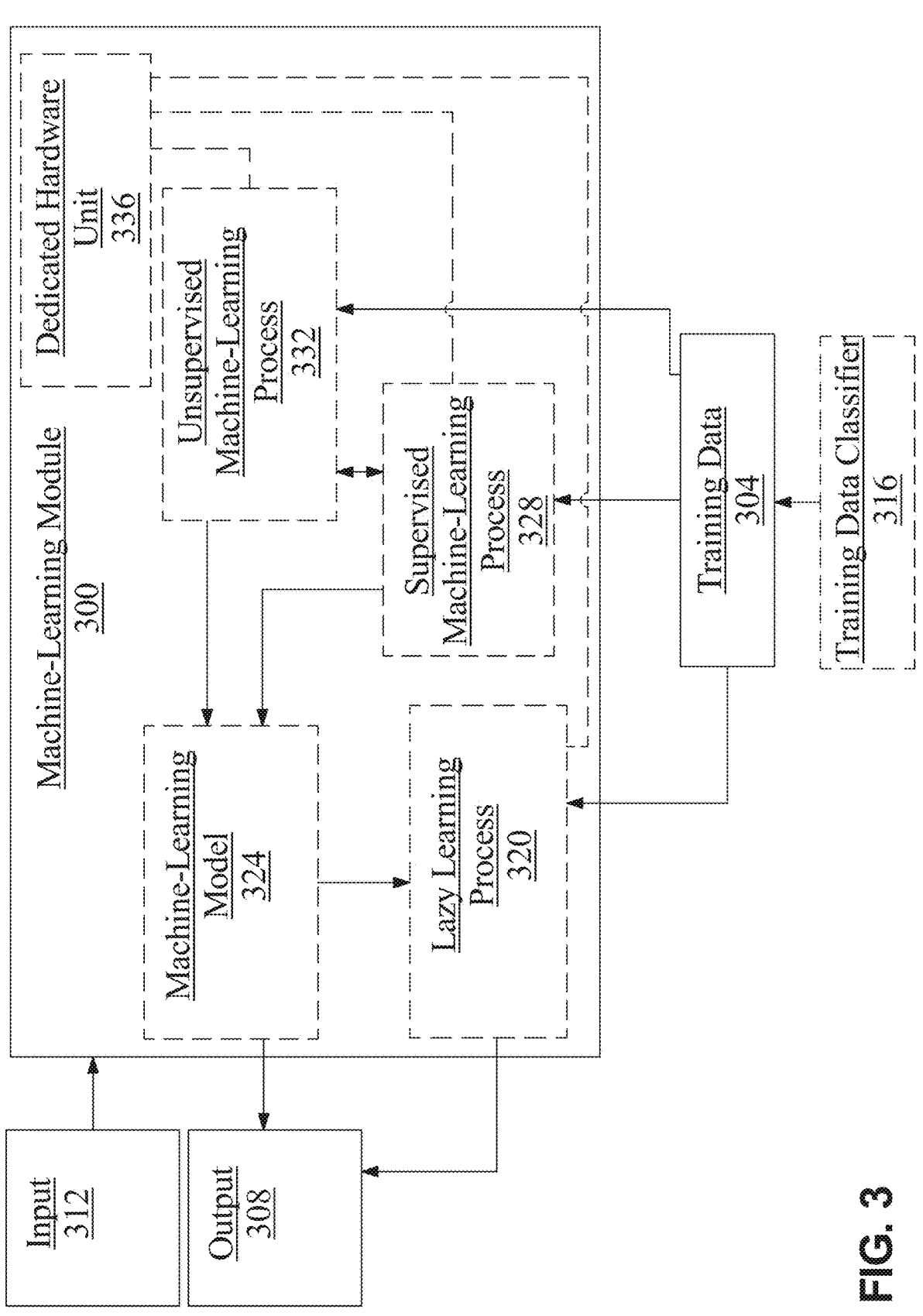
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, the input data may include node data extracted from a law firm profile such as firm name, office locations, number of attorneys, practice area specialization, historical case volumes, compliance records, and client satisfaction indicators. The output data may include classification into operational parameters such as system utilization, compliance adherence, or resource allocation, and into attribute metrics such as collaboration strength, governance adherence, or innovation engagement.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to sub-populations of law firms that share common operational or cultural traits, such as firms specializing in intellectual property litigation, firms maintaining a high ratio of senior partners to associates, or firms demonstrating above-average client retention rates. In another non-limiting example, the training data classifier may classify elements of training data to cohorts defined by anomaly-related behaviors, such as firms with repeated discrepancies in financial reporting or firms exhibiting abrupt fluctuations in staffing levels. Without limitation, the training data classifier may further classify elements of training data to cohorts of firms aligned with governance or compliance attributes, such as adherence to audit standards, adoption of diversity policies, or engagement in continuing legal education.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)÷P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include node profile features such as firm name, number of attorneys, office locations, historical case volumes, compliance records, and client satisfaction indicators as inputs, and corresponding classifications such as operational parameters (for example, compliance adherence, resource allocation, or system utilization), attribute metrics (for example, collaboration strength, governance adherence, or innovation engagement), anomaly scores, confidence scores, or acceptance decisions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
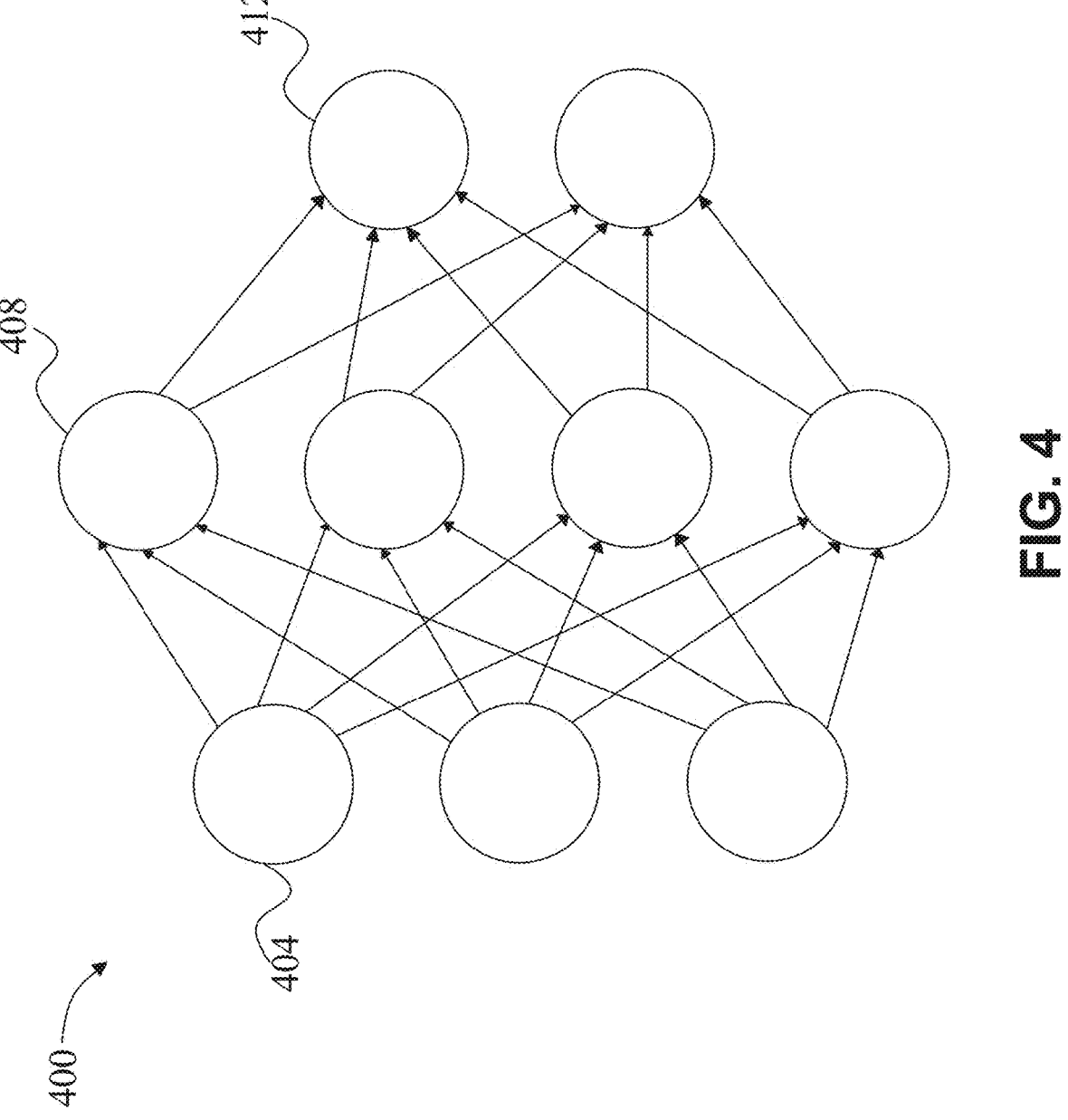
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
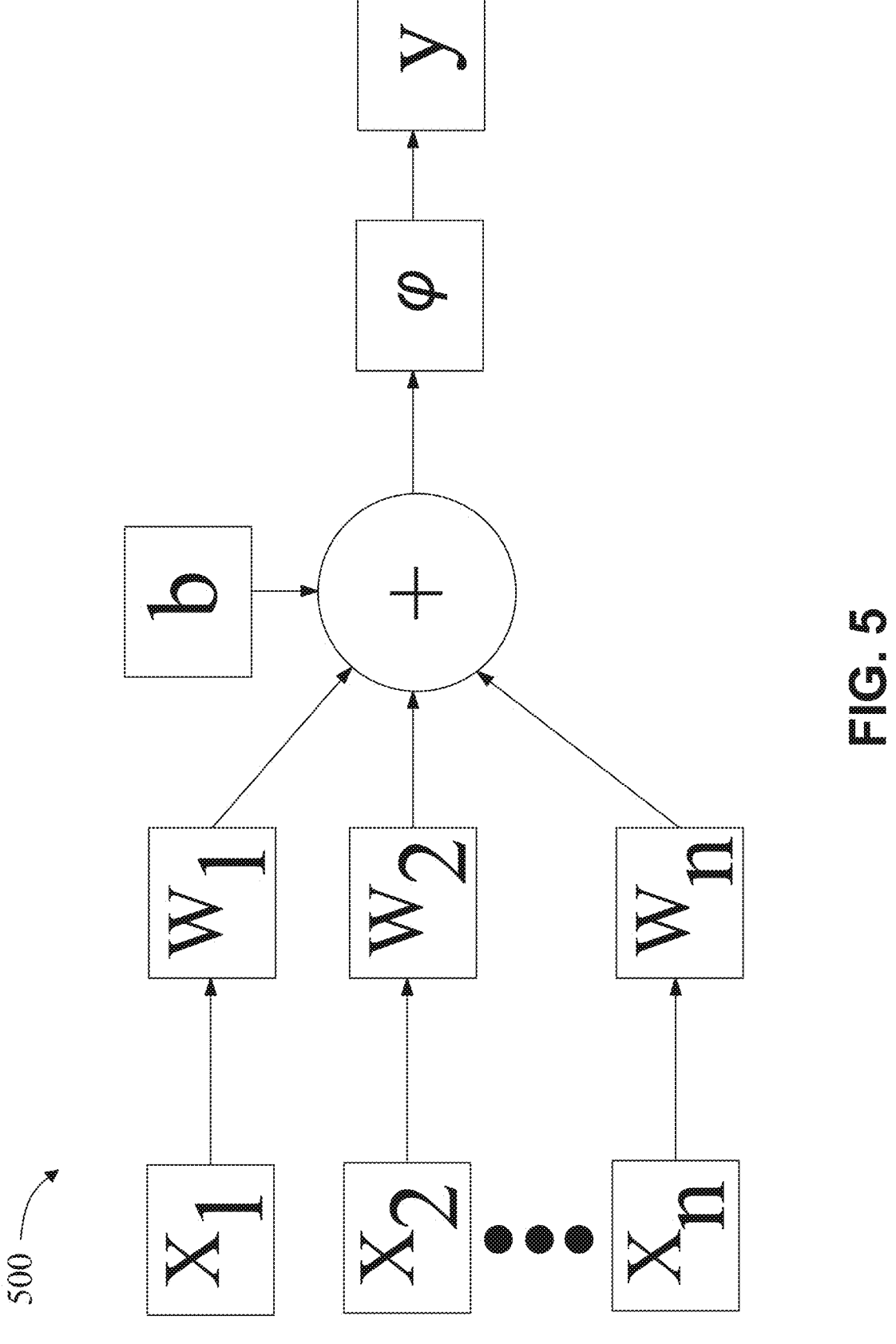
FIG. 5 is a diagram of an exemplary embodiment of a node of a neural network.

Referring now to FIG. 5, an exemplary embodiment of a node 500 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}.$$

where the inputs to an instant layer are $x_i$, a swish function such as $f(x) = x^*\text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$, applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
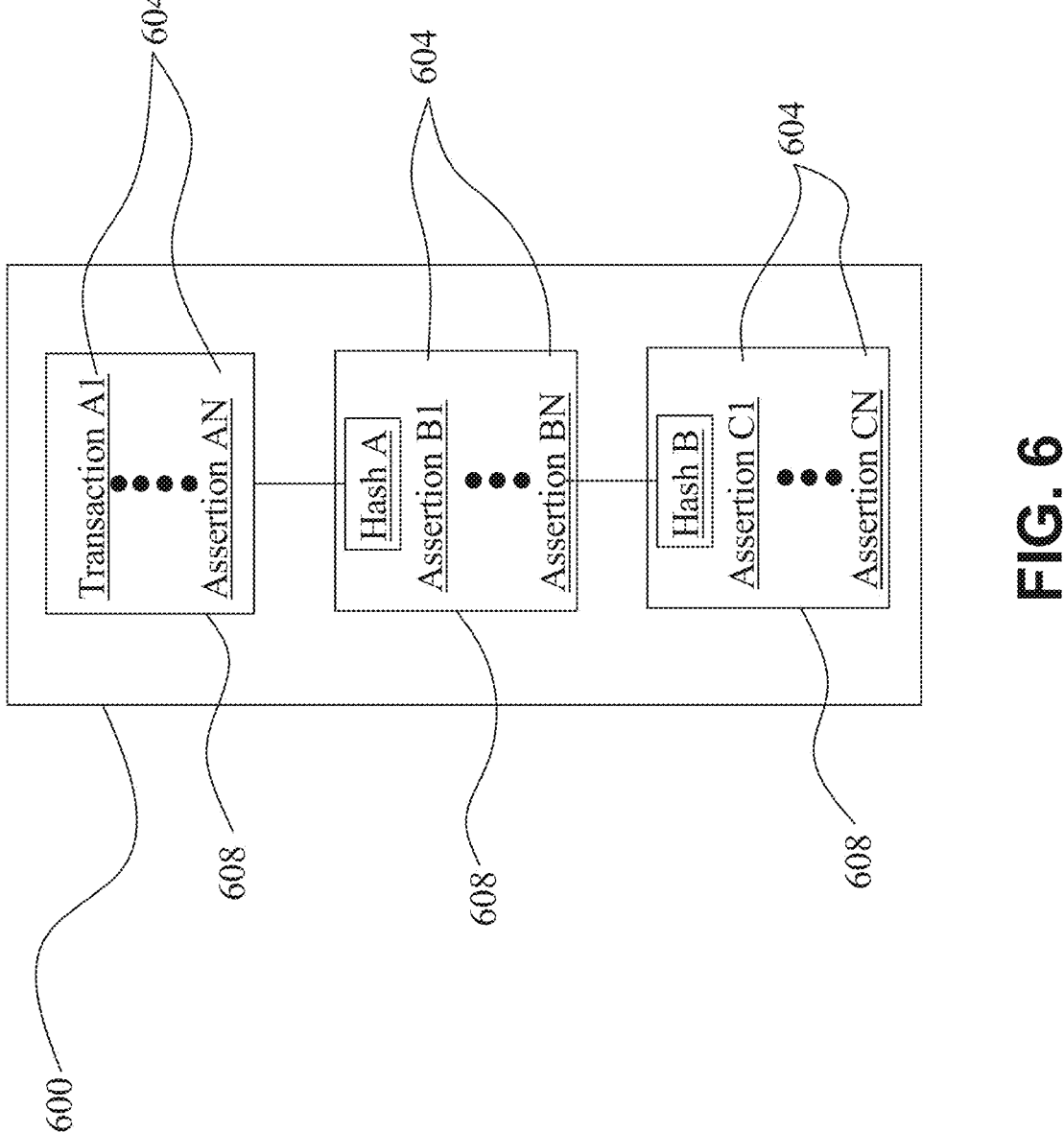
FIG. 6 is an exemplary embodiment of an immutable sequential listing.

Referring now to FIG. 6, an exemplary embodiment of an immutable sequential listing 600 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Data elements are listed in immutable sequential listing 600; data elements may include any form of data, including textual data, image data, encrypted data, cryptographically hashed data, and the like. Data elements may include, without limitation, one or more at least a digitally signed assertions. In one embodiment, a digitally signed assertion 604 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 604. In an embodiment, collection of textual data states that the owner of a certain transferable item represented in a digitally signed assertion 604 register is transferring that item to the owner of an address. A digitally signed assertion 604 may be signed by a digital signature created using the private key associated with the owner's public key, as described above.

Still referring to FIG. 6, a digitally signed assertion 604 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g.; a ride share vehicle or any other asset. A digitally signed assertion 604 may describe the transfer of a physical good;

for instance, a digitally signed assertion 604 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 604 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 6, in one embodiment, an address is a textual datum identifying the recipient of virtual currency or another item of value in a digitally signed assertion 604. In some embodiments, address is linked to a public key, the corresponding private key of which is owned by the recipient of a digitally signed assertion 604. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 604 may record a subsequent a digitally signed assertion 604 transferring some or all of the value transferred in the first a digitally signed assertion 604 to a new address in the same manner. A digitally signed assertion 604 may contain textual information that is not a transfer of some item of value in addition to, or as an alternative to, such a transfer. For instance, as described in further detail below, a digitally signed assertion 604 may indicate a confidence level associated with a distributed storage node as described in further detail below.

In an embodiment, and still referring to FIG. 6 immutable sequential listing 1XX records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 600 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 6, immutable sequential listing 600 may preserve the order in which the at least a posted content took place by listing them in chronological order; alternatively or additionally, immutable sequential listing 600 may organize digitally signed assertions 604 into sub-listings 608 such as "blocks" in a blockchain, which may be themselves collected in a temporally sequential order; digitally signed assertions 604 within a sub-listing 608 may or may not be temporally sequential. The ledger may preserve the order in which at least a posted content took place by listing them in sub-listings 608 and placing the sub-listings 608 in chronological order. The immutable sequential listing 600 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 600 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 6, immutable sequential listing 600, once formed, may be inalterable by any party, no matter what access rights that party possesses. For instance, immutable sequential listing 600 may include a hash chain, in which data is added during a successive hashing process to ensure non-repudiation. Immutable sequential listing 600 may include a block chain. In one embodiment, a block chain is immutable sequential listing 600 that records one or more new at least a posted content in a data item known as a sub-listing 608 or "block." An example of a block chain is the BITCOIN block chain used to record BITCOIN transactions and values. Sub-listings 608 may be created in a way that places the sub-listings 608 in chronological order and link each sub-listing 608 to a previous sub-listing 608 in the chronological order so that any computing device may traverse the sub-listings 608 in reverse chronological order to verify any at least a posted content listed in the block chain. Each new sub-listing 608 may be required to contain a cryptographic hash describing the previous sub-listing 608. In some embodiments, the block chain contains a single first sub-listing 608 sometimes known as a "genesis block."

Still referring to FIG. 6, the creation of a new sub-listing 608 may be computationally expensive; for instance, the creation of a new sub-listing 608 may be designed by a "proof of work" protocol accepted by all participants in forming the immutable sequential listing 600 to take a powerful set of computing devices a certain period of time to produce. Where one sub-listing 608 takes less time for a given set of computing devices to produce the sub-listing 608 protocol may adjust the algorithm to produce the next sub-listing 608 so that it will require more steps; where one sub-listing 608 takes more time for a given set of computing devices to produce the sub-listing 608 protocol may adjust the algorithm to produce the next sub-listing 608 so that it will require fewer steps. As an example, protocol may require a new sub-listing 608 to contain a cryptographic hash describing its contents; the cryptographic hash may be required to satisfy a mathematical condition, achieved by having the sub-listing 608 contain a number, called a nonce, whose value is determined after the fact by the discovery of the hash that satisfies the mathematical condition. Continuing the example, the protocol may be able to adjust the mathematical condition so that the discovery of the hash describing a sub-listing 608 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 608 according to the protocol is known as "mining." The creation of a new sub-listing 608 may be designed by a "proof of stake" protocol as will be apparent to those skilled in the art upon reviewing the entirety of this disclosure.

Continuing to refer to FIG. 6, in some embodiments, protocol also creates an incentive to mine new sub-listings 608. The incentive may be financial; for instance, successfully mining a new sub-listing 608 may result in the person or entity that mines the sub-listing 608 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 608 Each sub-listing 608 created in immutable sequential listing 600 may contain a record or at least a posted content describing one or more addresses that receive an incentive, such as virtual currency, as the result of successfully mining the sub-listing 608.

With continued reference to FIG. 6, where two entities simultaneously create new sub-listings 608, immutable sequential listing 600 may develop a fork; protocol may determine which of the two alternate branches in the fork is the valid new portion of the immutable sequential listing 600 by evaluating, after a certain amount of time has passed, which branch is longer. "Length" may be measured according to the number of sub-listings 608 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 608 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 600 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 600.

Still referring to FIG. 6, additional data linked to at least a posted content may be incorporated in sub-listings 608 in the immutable sequential listing 600; for instance, data may be incorporated in one or more fields recognized by block chain protocols that permit a person or computer forming a at least a posted content to insert additional data in the immutable sequential listing 600. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 6, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 608 in a block chain computationally challenging; the incentive for producing sub-listings 608 may include the grant of new crypto-currency to the miners. Quantities of crypto-currency may be exchanged using at least a posted content as described above.

Referring now to FIG. 7, a flow diagram of an exemplary method 700 for generating a node database is illustrated. At step 705, method 700 includes receiving, using at least a processor, a node profile of a plurality of node profiles, wherein the node profile comprises a node data. In an embodiment, the at least a processor is further configured to validate, using a validation model, the node data by cross-referencing the node data with external verification sources and assigning a validation score to the node profile as a function of consistency between the node data and the external verification sources. This may be implemented as described and with reference to FIGS. 1-6.

Still referring to FIG. 7, at step 710, method 700 includes identifying, using the at least a processor, one or more operational parameters and attribute metrics of the node data. In an embodiment, the at least a processor may be further configured to identify the one or more operational parameters and the attribute metrics by classifying the node data into predefined categories, comparing classified node data with baseline feature sets stored in a reference database, and identifying the one or more operational parameters and the attribute metrics based on the comparison. This may be implemented as described and with reference to FIGS. 1-6.

Still referring to FIG. 7, at step 715, method 700 includes comparing, using the at least a processor, the one or more operational parameters and the attribute metrics with target data. In an embodiment, the at least a processor may be further configured to compare the one or more operational parameters and the attribute metrics with target data by retrieving threshold values associated with the target data and determining whether the one or more operational parameters and the attribute metrics satisfy the threshold values. This may be implemented as described and with reference to FIGS. 1-6.

Still referring to FIG. 7, at step 720, method 700 includes determining, using the at least a processor, a status of the node profile based on a comparison of the one or more operational parameters and the attribute metrics with target data. In an embodiment, the at least a processor may be further configured to generate the acceptance signal for each node profile of the plurality of node profiles as a function of a preferred communication method of node profile. In an embodiment, the at least a processor may be further configured to flag, using an anomaly-detection model, misrepresented data of the node profile, wherein the anomaly-detection model is configured to flag the misrepresented data of the node profile by detecting one or more deviations between the node data and statistical patterns of verified historical node data, assigning an anomaly score to the node profile, flagging the node profile where the anomaly score exceeds a predetermined anomaly level, and generating an invalid status based on a flagged node profile. In an embodiment, the at least a processor may be further configured to train the anomaly-detection model using anomaly training data comprising historical node data corresponding to historical anomalies. In an embodiment, the at least a processor may be further configured to generate node feedback associated with an invalidation of the node profile and transmit the node feedback to a client device. This may be implemented as described and with reference to FIGS. 1-6.

Still referring to FIG. 7, at step 725, method 700 includes generating, using the at least a processor, a node database as a function of the status of the node profile. This may be implemented as described and with reference to FIGS. 1-6.

Still referring to FIG. 7, at step 730, method 700 includes generating and transmitting, using the at least a processor, an acceptance signal to the node associated with the node profile as a function of the status, wherein the status comprises an acceptance status. This may be implemented as described and with reference to FIGS. 1-6.

Still referring to FIG. 7, at step 735, method 700 includes storing, using the at least a processor, the node database within an immutable ledger. In an embodiment, the at least a processor may be further configured to store the node database within the immutable ledger by segmenting the node database into sequential event records, cryptographically hashing each event record of the sequential event records to generate a block identifier, and linking the block identifier with prior block identifiers to form the immutable ledger. In an embodiment, the at least a processor may be further configured to display, using a user interface of a downstream device, the node database, wherein displaying the node database further comprises generating a graphical visualization, generating a confidence score for each node profile of the plurality of node profiles, and displaying the graphical visualization and the confidence score. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
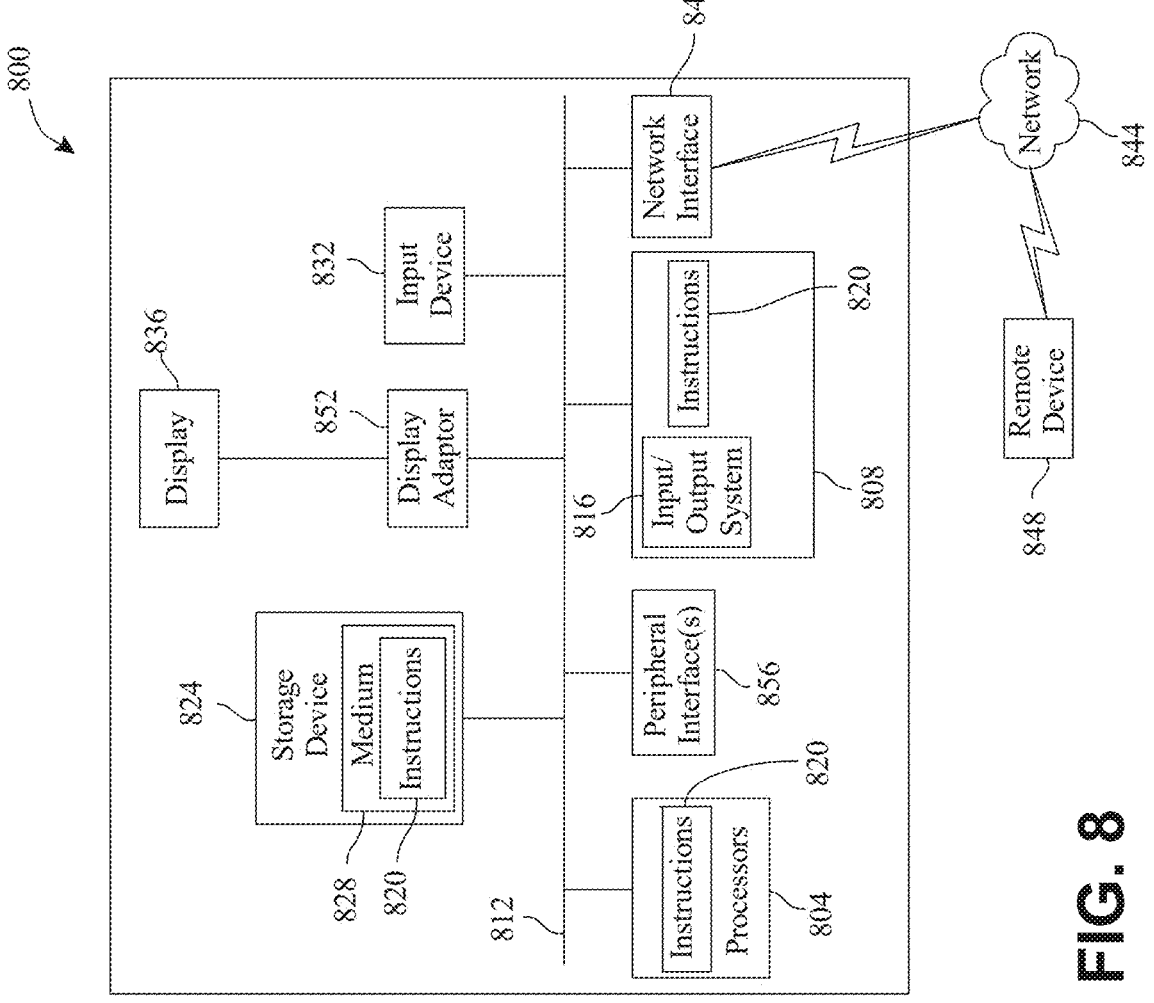
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a node database, wherein the apparatus comprises:

at least a computing device, wherein the computing device comprises:
a memory; and
at least a processor communicatively connected to the memory, wherein the memory contains instructions configuring the at least a processor to:
receive a node profile of a plurality of node profiles, wherein the node profile comprises node data;
identify one or more operational parameters and attribute metrics of the node data, wherein identifying the one or more operational parameters and attribute metrics comprises parsing structured and unstructured records of the node data and mapping data fields of the structured and unstructured records of the node data to predefined operational and attribute categories using one or more of: a rule based classifier, schema-based comparison, or a machine learning classification model trained on historical node data;
compare the one or more operational parameters and the attribute metrics with target data, wherein comparing comprises executing a classification or inference process that evaluates the operational parameters and attribute metrics as a function of an expected performance threshold;
determine, using a comparison of the one or more operational parameters and the attribute metrics with the target data, a status of the node profile;
generate a node database as a function of the status of the node profile;
generate and transmit an acceptance signal to a node associated with the node profile as a function of the status, wherein the status comprises an acceptance status; and
store the node database within an immutable ledger.

2. The apparatus of claim 1, wherein the at least a processor is further configured to identify the one or more operational parameters and the attribute metrics by:
classifying the node data into predefined categories;
comparing classified node data with baseline feature sets stored in a reference database; and
identifying the one or more operational parameters and the attribute metrics based on the comparison.

3. The apparatus of claim 1, wherein the at least a processor is further configured to compare the one or more operational parameters and the attribute metrics with the target data by:
retrieving threshold values associated with the target data; and
determining whether the one or more operational parameters and the attribute metrics satisfy the threshold values.

4. The apparatus of claim 1, wherein the at least a processor is further configured to generate the acceptance signal for each node profile of the plurality of node profiles as a function of a preferred communication method of node profile.

5. The apparatus of claim 1, wherein the at least a processor is further configured to flag, using an anomaly-detection model, misrepresented data of the node profile, wherein the anomaly-detection model is configured to flag the misrepresented data of the node profile by:
detecting one or more deviations between the node data and statistical patterns of verified historical node data;
assigning an anomaly score to the node profile;
flagging the node profile where the anomaly score exceeds a predetermined anomaly level; and generating an invalid status based on a flagged node profile.

6. The apparatus of claim 5, wherein the at least a processor is further configured to train the anomaly-detection model using anomaly training data comprising historical node data corresponding to historical anomalies.

7. The apparatus of claim 1, wherein the at least a processor is further configured to display, using a user interface of a downstream device, the node database, wherein displaying the node database further comprises:
    generating a graphical visualization;
    generating a confidence score for each node profile of the plurality of node profiles; and
    displaying the graphical visualization and the confidence score.

8. The apparatus of claim 1, wherein the at least a processor is further configured to store the node database within the immutable ledger by:
    segmenting the node database into sequential event records;
    cryptographically hashing each event record of the sequential event records to generate a block identifier; and
    linking the block identifier with prior block identifiers to form the immutable ledger.

9. The apparatus of claim 1, wherein the at least a processor is further configured to:
    generate node feedback associated with an invalidation of the node profile; and
    transmit the node feedback to a client device.

10. The apparatus of claim 1, wherein the at least a processor is further configured to validate, using a validation model, the node data by:
    cross-referencing the node data with external verification sources; and
    assigning a validation score to the node profile as a function of consistency between the node data and the external verification sources.

11. A method for generating a node database, wherein the method comprises:
    receiving, using at least a processor, a node profile of a plurality of node profiles, wherein the node profile comprises node data;
    identifying, using the at least a processor, one or more operational parameters and attribute metrics of the node data wherein identifying the one or more operational parameters and attribute metrics comprises parsing structured and unstructured records of the node data and mapping data fields of the structured and unstructured records of the node data to predefined operational and attribute categories using one or more of: a rule based classifier, schema-based comparison, or a machine learning classification model trained on historical node data;
    comparing, using the at least a processor, the one or more operational parameters and the attribute metrics with target data, wherein comparing comprises executing a classification or inference process that evaluates the operational parameters and attribute metrics as a function of an expected performance threshold;
    determining, using the at least a processor, a status of the node profile based on a comparison of the one or more operational parameters and the attribute metrics with the target data;
    generating, using the at least a processor, a node database as a function of the status of the node profile;

generating and transmitting, using the at least a processor, an acceptance signal to a node associated with the node profile as a function of the status, wherein the status comprises an acceptance status; and
    storing, using the at least a processor, the node database within an immutable ledger.

12. The method of claim 11, further comprising identifying, using the at least a processor, the one or more operational parameters and the attribute metrics by:
    classifying the node data into predefined categories;
    comparing classified node data with baseline feature sets stored in a reference database; and
    identifying the one or more operational parameters and the attribute metrics based on the comparison.

13. The method of claim 11, further comprising comparing, using the at least a processor, the one or more operational parameters and the attribute metrics with the target data by:
    retrieving threshold values associated with the target data; and
    determining whether the one or more operational parameters and the attribute metrics satisfy the threshold values.

14. The method of claim 11, further comprising generating, using the at least a processor, the acceptance signal for each node profile of the plurality of node profiles as a function of a preferred communication method of node profile.

15. The method of claim 11, further comprising flagging, using an anomaly-detection model, misrepresented data of the node profile, wherein the anomaly-detection model is configured to flag the misrepresented data of the node profile by:
    detecting, using the at least a processor, one or more deviations between the node data and statistical patterns of verified historical node data;
    assigning, using the at least a processor, an anomaly score to the node profile;
    flagging, using the at least a processor, the node profile where the anomaly score exceeds a predetermined anomaly level; and
    generating, using the at least a processor, an invalid status based on a flagged node profile.

16. The method of claim 15, further comprising training, using the at least a processor, the anomaly-detection model using anomaly training data comprising historical node data corresponding to historical anomalies.

17. The method of claim 11, further comprising displaying, using a user interface of a downstream device, the node database, wherein displaying the node database further comprises:
    generating, using the at least a processor, a graphical visualization; and
    generating, using the at least a processor, a confidence score for each node profile of the plurality of node profiles; and
    displaying the graphical visualization and the confidence score.

18. The method of claim 11, further comprising storing, using the at least a processor, the node database within the immutable ledger by:
    segmenting the node database into sequential event records;
    cryptographically hashing each event record of the sequential event records to generate a block identifier; and linking the block identifier with prior block identifiers to form the immutable ledger.

19. The method of claim 11, further comprising:

generating, using the at least a processor, node feedback associated with an invalidation of the node profile; and transmitting, using the at least a processor, the node feedback to a client device.

20. The method of claim 11, further comprising validating, using a validation model, the node data by:

cross-referencing the node data with external verification sources; and assigning a validation score to the node profile as a function of consistency between the node data and the external verification sources.

\* \* \* \* \*